(12) United States Patent
Liu et al.

(10) Patent No.: US 10,680,227 B2
(45) Date of Patent: Jun. 9, 2020

(54) BATTERY PARALLEL DEVICE HAVING CHARGE PATH AND DISCHARGE PATH WITH EQUAL IMPEDANCES

(71) Applicant: STONE ENERGY TECHNOLOGY CORPORATION, New Taipei (TW)

(72) Inventors: Chin-Chuan Liu, Kaohsiung (TW); Li-Ho Yao, Taipei (TW)

(73) Assignee: STONE ENERGY TECHNOLOGY CORPORATION, New Taipei (TW)

( * ) Notice: Subject to any disclaimer, the term of this patent is extended or adjusted under 35 U.S.C. 154(b) by 321 days.

(21) Appl. No.: 15/590,913

(22) Filed: May 9, 2017

(65) Prior Publication Data

US 2018/0130990 A1    May 10, 2018

(30) Foreign Application Priority Data

Nov. 8, 2016   (TW) .............................. 105136190 A

(51) Int. Cl.
  *H01M 2/20*    (2006.01)
  *H01M 2/10*    (2006.01)
  *H01M 2/30*    (2006.01)

(52) U.S. Cl.
  CPC ......... *H01M 2/206* (2013.01); *H01M 2/1077* (2013.01); *H01M 2/30* (2013.01); *H01M 2220/20* (2013.01)

(58) Field of Classification Search
  CPC .... H01M 2/1077; H01M 2/202; H01M 2/206; H01M 2/266; H01M 2/30; H01M 2220/20; H01M 10/0445
  See application file for complete search history.

(56) References Cited

U.S. PATENT DOCUMENTS

| 5,578,392 A | 11/1996 | Kawamura |
| 9,077,018 B2* | 7/2015 | Adachi ............... H01M 10/655 |
| 2011/0293998 A1* | 12/2011 | Sato .................... H01M 2/1077 |
| | | 429/159 |
| 2015/0072210 A1 | 3/2015 | Waigel et al. |

FOREIGN PATENT DOCUMENTS

| CN | 105244533 A | 1/2016 |
| CN | 105591048 A | 5/2016 |
| JP | 2001-167753 A | 6/2001 |
| JP | 2011-65794 A | 3/2011 |
| JP | 2011-253641 | 12/2011 |
| KR | 10-2010-0134111 | 12/2010 |
| KR | 10-1201066 | 11/2012 |
| TW | I308406 | 8/2006 |
| WO | 2014/155410 A1 | 10/2014 |

* cited by examiner

*Primary Examiner* — Anca Eoff
(74) *Attorney, Agent, or Firm* — Sinorica, LLC

(57) ABSTRACT

A battery parallel device having a charge path and a discharge path with equal impedances includes at least one first parallel apparatus. The at least one first parallel apparatus has first battery units each having a plurality of first batteries, a first positive connector electrically connected to positive electrodes of the first batteries, a first negative connector electrically connected to negative electrodes of the first batteries, a first positive electrode connector formed on the first positive connector, a first negative electrode connector formed on the first negative connector, first current paths formed between the first positive electrode connector and the positive electrodes, and second current paths formed between the first negative electrode connector and the negative electrodes. A total path length of the first current paths and a total path length of the second current paths corresponding to the same first batteries are equal. Therefore, inrush current may be decreased.

33 Claims, 15 Drawing Sheets

BATTERY PARALLEL DEVICE HAVING CHARGE PATH AND DISCHARGE PATH WITH EQUAL IMPEDANCES

CROSS-REFERENCE TO RELATED APPLICATIONS

This application claims the priority benefit of TW application serial No. 105136190, filed on Nov. 8, 2016. The entirety of the above-mentioned patent application is hereby incorporated by reference herein and made a part of the specification.

BACKGROUND OF THE INVENTION

1. Field of the Invention

The present invention relates to a battery device, and particularly to a battery parallel device having a charge path and a discharge path with equal impedances.

2. Description of the Related Art

For years, automobile systems have used electricity as the power source. An electricity power supply device of the automobile system may be a chargeable battery pack having a plurality of small chargeable batteries or just a large single chargeable battery. The chargeable battery pack or the large single chargeable battery may have defects.

For example, the chargeable battery pack is consisted of the small chargeable batteries. Since each of the small chargeable batteries has a respective weight and a respective volume, the total weight and total volume of the chargeable battery pack may not be neglected. When the chargeable battery pack is applied to the automobile system, the weight and the volume of the chargeable battery pack may become a burden of the automobile system.

Since a manufacturing technique of the large single chargeable battery is more complex than a conventional battery, complexity of the large single chargeable battery may be raised with volume of the large single chargeable battery, and safety of the large single chargeable battery may be decreased. Therefore, the greater volume of the large single chargeable battery is, the higher the probability of explosion the large single chargeable battery has. When the large single chargeable battery is applied to the automobile system, the danger and the damage of the large single chargeable battery may not be ignored.

A battery set consisting of a plurality of small batteries is designed. As in the TWI308406 patent application, a battery set is disclosed. With reference to FIG. 15, the battery set 150 consists of a plurality of small batteries 1500. The small batteries 1500 are arranged to be a matrix, and are electrically connected in parallel and in series to form a web electronic connection. The battery set 150 comprises a positive electrode 1501 and a negative electrode 1502. The positive electrode 1501 and the negative electrode 1502 of the battery set 150 are electrically connected to a load (not shown in figures), and provide the load with electricity power.

Since the small batteries 1500 of the battery set 150 are electrically connected electrically connected in parallel and in series to form the web electronic connection, when one of the small batteries 1500 is broken, the battery set 150 may still normally work by the other normal small batteries 1500. Further, since currents of the small batteries 1500 equally flow through the web electronic connection, the currents of the small batteries 1500 may be separate. A connecting bar of the web electronic connection may not need to be wide in diameter to ensure safety of the battery set 150, and weight of the battery set 150 may be decreased.

Normally, the small batteries 1500 of the battery set 150 should be identical. Such as, impedances of the small batteries 1500 detected from the output terminal of the battery set 150 should be the same. In other words, each of the small batteries 1500 has a DC internal resistance, a positive plate, and a negative plate. A total impedance of the small batteries 1500 is added by impedance of the DC internal resistance, impedance of the positive plate, and impedance of the negative plate, and the total impedances of all the small batteries may be equal. Then, parallel structure of the small batteries 1500 may be balanced.

When the parallel structure of the small batteries 1500 is not balanced, output currents of the small batteries 1500 may be different at the moment of power up. Then, the small batteries 1500 may cause voltage difference. For example, an impedance of an internal resistance of a conventional Lithium-ion battery is smaller than 1 mΩ, and the voltage difference of the conventional Lithium-ion battery at the moment of power up may be smaller than 1 volt, but an inrush current of the conventional Lithium-ion battery may be greater than 100 amperes.

When the battery set 150 provides electricity power to the load, an internal current of the battery set 150 flows from the negative electrode 1502 to the positive electrode 1501, and flows through the small batteries 1500. Since the small batteries 1500 are electrically connected in parallel and in series to form the web electronic connection, the impedances of the internal resistances of the small batteries 1500 detected from the output terminal of the battery set 150 are different, and the parallel structure of the small batteries 1500 may be unbalanced.

A conventional technique to detect current, such as a current clamp, an ammeter, a hall-effect sensor, or an ammeter shunt, may have difficultly detecting the inrush current. Therefore, the inrush current is usually ignored, but the inrush current may influence the life time of the small batteries 1500 and decrease the life time of the battery set 150.

SUMMARY OF THE INVENTION

An objective of the present invention is to provide a battery parallel device having a charge path and a discharge path with equal impedances.

To achieve the foregoing objective, one embodiment of the battery parallel device comprises at least one first parallel apparatus.

The at least one first parallel apparatus comprises a plurality of first battery units, a first positive connector, a first negative connector, a first positive electrode connector, and a first negative electrode connector.

Each of the first battery units comprises a plurality of first batteries, and each of the first batteries comprises a positive electrode and a negative electrode.

The first positive connector is electrically connected to the positive electrodes of the first batteries of the first battery units.

The first negative connector is electrically connected to the negative electrodes of the first batteries of the first battery units.

The first positive electrode connector is formed on a terminal of the first positive connector, and a plurality of first current paths are respectively formed between the first positive electrode connector and each of the positive electrodes of the first batteries.

The first negative electrode connector is formed on a terminal of the first negative connector, and a plurality of second current paths are respectively formed between the first negative electrode connector and each of the negative electrodes of the first batteries.

Each of the first batteries has a total path length which is a sum of a length of the first current path and a length of the second current path corresponding to the same first battery, and the total path lengths of all of the first batteries are equal.

The total path length of the first current path and the total path length of the second current path of the first batteries are equal, and currents flow through an inside of the battery parallel device according to the first current path and the second current path.

When the battery parallel device is electrically connected to a load to provide the load with electricity power, the currents flow with the same total path length inside the battery parallel device. Therefore, parallel structure of the battery parallel device may be balanced, and the life time of the battery parallel device may be extended.

Besides, another embodiment of the battery parallel device comprises at least one first parallel apparatus.

The at least one first parallel apparatus comprises a plurality of first battery units, a first positive connector, a first negative connector, a first positive electrode connector, and a first negative electrode connector.

Each of the first battery units is a pouch type battery, and comprises a battery core, a first shell, and a second shell. The battery core is mounted between the first shell and the second shell. The battery cores of the first battery units each respectively comprise a positive electrode and a negative electrode, and the positive electrodes of the battery cores face the same direction.

The first positive connector comprises a connecting part and a plurality of comb parts. The comb parts are separated from each other, and are mounted along a first direction. Terminals of the comb parts that face the first direction are connected with the connecting part, and the comb parts are respectively electrically connected to the positive electrodes of the battery cores of one of the first battery units.

The first negative connector comprises a connecting part and a plurality of comb parts. The comb parts of the first negative connector are separated from each other, and are mounted along the first direction. Terminals of the comb parts of the first negative connector that face a direction opposite to the first direction are connected with the connecting part of the first negative connector, and the comb parts of the first negative connector are respectively electrically connected to the negative electrodes of the battery cores of one of the first battery units.

The first positive electrode connector is formed on the connecting part of the first positive connector.

The first negative electrode connector is formed on the connecting part of the first negative connector.

When the battery parallel device is electrically connected to the load and provides the load with electricity power, the currents flow inside the battery parallel device. Therefore, parallel structure of the battery parallel device may be balanced, and the life time of the battery parallel device may be extended.

Other objectives, advantages and novel features of the invention will become more apparent from the following detailed description when taken in conjunction with the accompanying drawings.

DETAILED DESCRIPTION OF THE INVENTION

Figure 1:
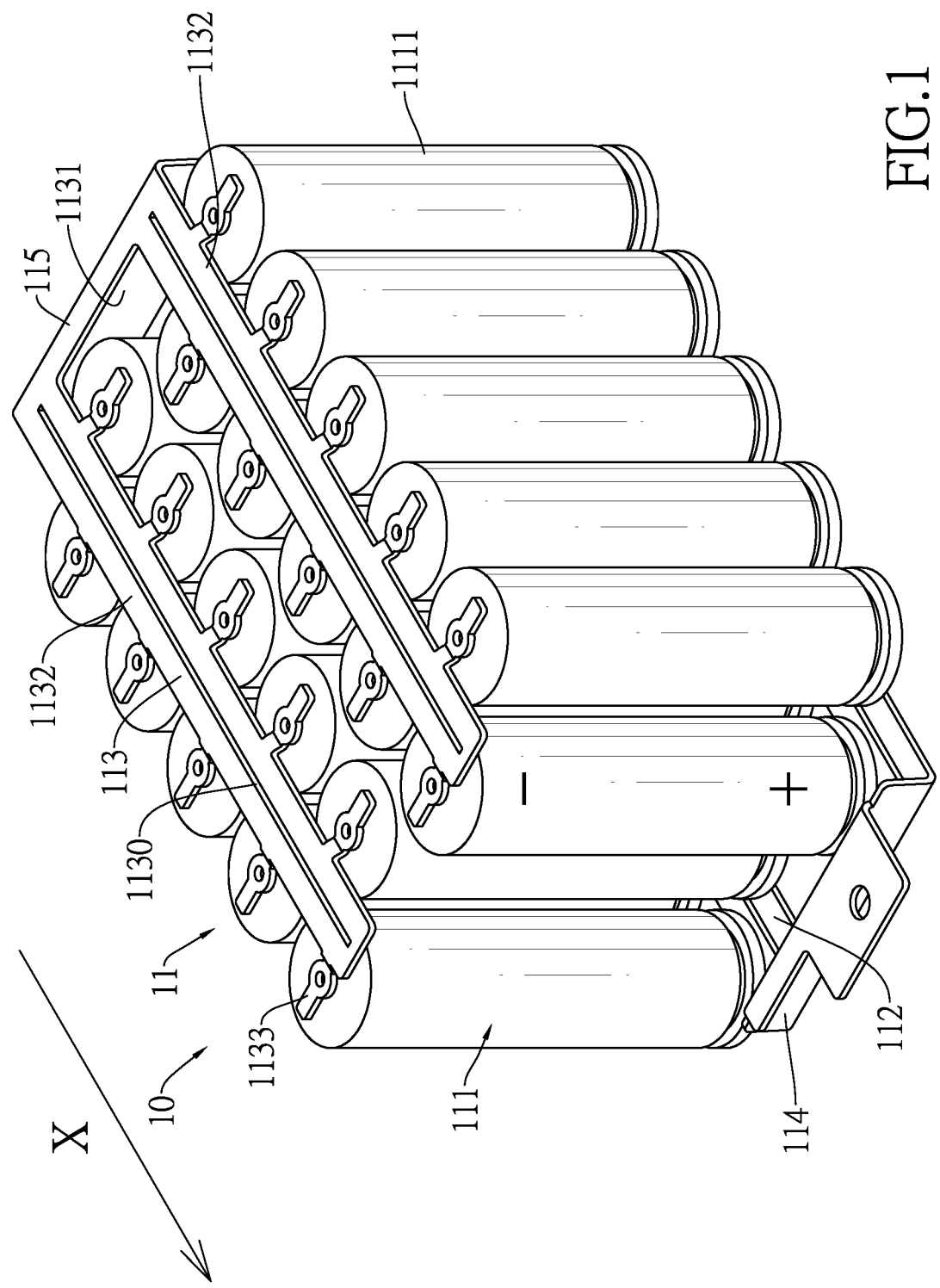
FIG. 1 is a perspective view of an embodiment of a battery parallel device having a charge path and a discharge path with equal impedances of the present application.
Figure 2:
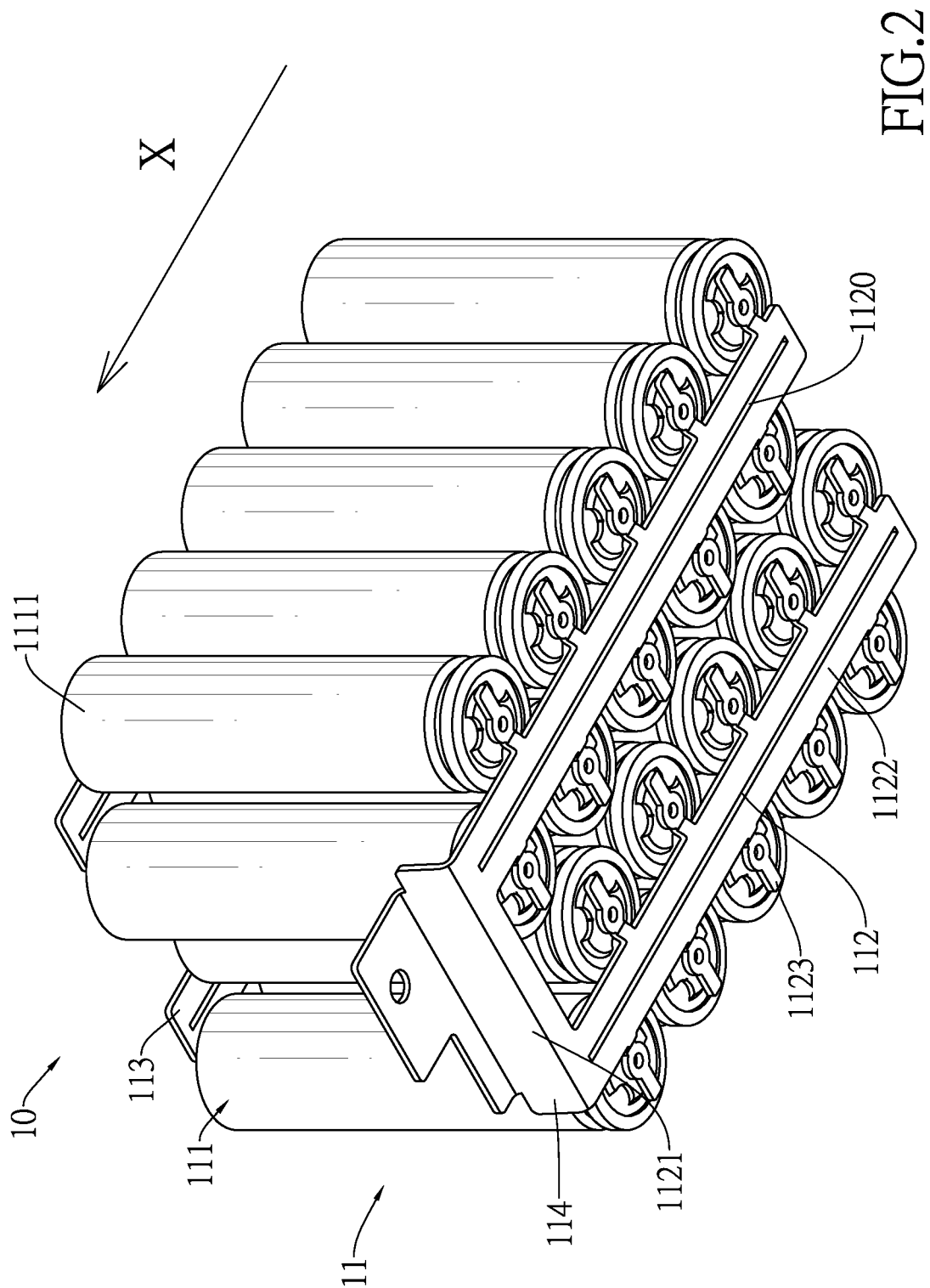
FIG. 2 is another perspective view of the battery parallel device of FIG. 1.
Figure 3:
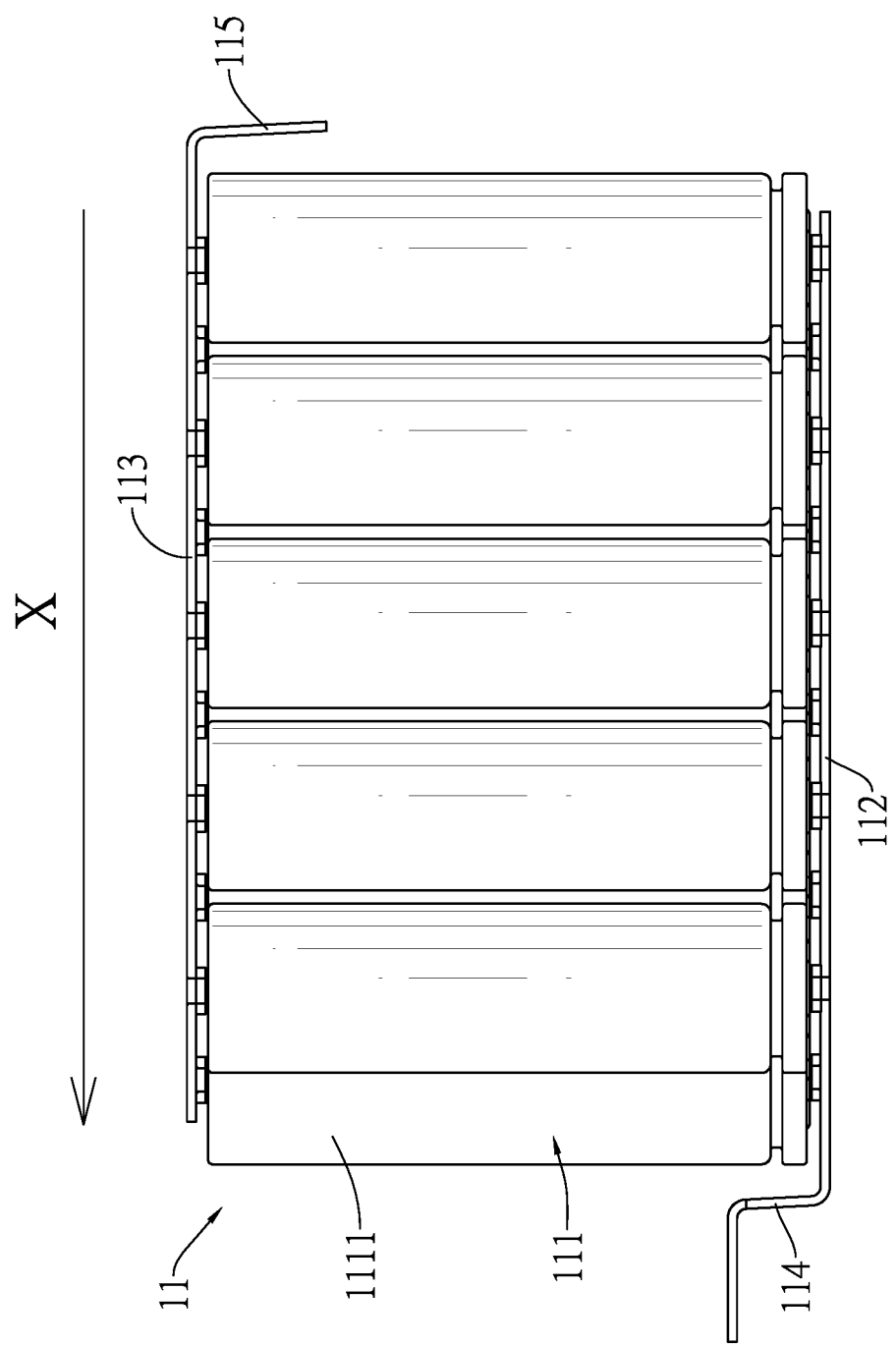
FIG. 3 is a side view of the battery parallel device of FIG. 1.

With reference to FIGS. 1, 2, and 3, the present invention is a battery parallel device 10 having a charge path and a discharge path with equal impedances. The battery parallel device 10 comprises at least one first parallel apparatus 11, and the at least one first parallel apparatus 11 comprises a plurality of first battery units 111, a first positive connector 112, a first negative connector 113, a first positive electrode connector 114, and a first negative electrode connector 115.

Each of the first battery units 111 comprises a plurality of first batteries, and each of the first batteries comprises a positive electrode and a negative electrode.

The first positive connector 112 is electrically connected to the positive electrodes of the first batteries of the first battery units 111. The first negative connector 113 is electrically connected to the negative electrodes of the first batteries of the first battery units 111.

The first positive electrode connector 114 is formed on a terminal of the first positive connector 112, and a plurality of first current paths are respectively formed between the first positive electrode connector 114 and each of the positive electrodes of the first batteries.

The first negative electrode connector 115 is formed on a terminal of the first negative connector 113, and a plurality of second current paths are respectively formed between the first negative electrode connector 115 and each of the negative electrodes of the first batteries.

Each of the first batteries has a total path length which is a sum of a length of the first current path and a length of the second current path corresponding to the same first battery, and the total path lengths of all of the first batteries are equal.

When the battery parallel device 10 is electrically connected to a load (not shown in the figures) to provide the load with electricity power, flowing lengths of the currents that flow inside the battery parallel device 10 are the same and equal to the total path length. Therefore, parallel structure of the battery parallel device 10 may be balanced to decrease inrush currents, and the life time of the battery parallel device may be extended.

In the embodiment, the length of each of the first current paths is a distance between the first negative electrode connector 115 and each of the first batteries. The first current paths corresponding to different first batteries are different.

The length of each of the second current paths is a distance between the first positive electrode connector 114 and each of the first batteries. The second current paths corresponding to different first batteries are different.

In the embodiment, the first batteries of the first battery units 111 are first cylindrical batteries 1111, and the first cylindrical batteries 1111 are mounted along a first direction X. The positive electrodes of the first cylindrical batteries 1111 face to the same direction, and the first battery units 111 are separated from each other.

The first positive connector 112 comprises a connecting part 1121 and a plurality of comb parts 1122. The comb parts 1122 are separated from each other, and are mounted along the first direction X. Terminals of the comb parts 1122 that face the first direction X are connected with the connecting part 1121, and the comb parts 1122 are respectively electrically connected to the positive electrodes of the first cylindrical batteries 1111 of one of the first battery units 111.

The first negative connector 113 comprises a connecting part 1131 and a plurality of comb parts 1132. The comb parts 1132 of the first negative connector 113 are separated from each other, and are mounted along the first direction X. Terminals of the comb parts 1132 of the first negative connector 113 that face a direction opposite to the first direction X are connected with the connecting part 1131 of the first negative connector 113, and the comb parts 1132 of the first negative connector 113 are respectively electrically connected to the negative electrodes of the first cylindrical batteries 1111 of one of the first battery units 111.

The first positive electrode connector 114 is formed on the connecting part 1121 of the first positive connector 112. The first negative electrode connector 115 is formed on the connecting part 1131 of the first negative connector 113.

The first cylindrical batteries 1111 of the first battery units 111 are mounted along the first direction X, the first positive electrode connector 114 is formed on the connecting part 1121 of the first positive connector 112, and the first negative electrode connector 115 is formed on the connecting part 1131 of the first negative connector 113.

When the battery parallel device 10 is electrically connected to the load to provide the load with electricity power, the flowing lengths of the currents that flow through each of the first cylindrical batteries 1111 inside the battery parallel device 10 may be the same. Therefore, the parallel structure of the battery parallel device 10 may be balanced.

Conversely, when the battery parallel device 10 is electrically connected to a power source to be charged, the flowing lengths of the currents that flow through each of the first cylindrical batteries 1111 inside the battery parallel device 10 may also be the same. Therefore, the parallel structure of the battery parallel device 10 may be balanced.

Figure 4:
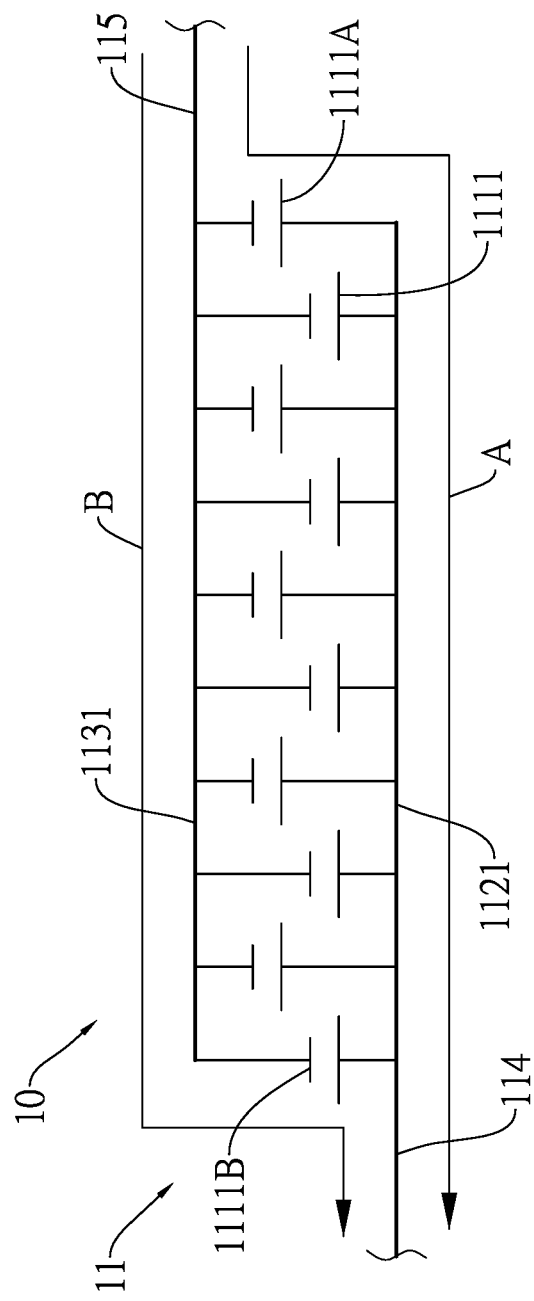
FIG. 4 is a schematic circuit diagram of the battery parallel device of FIG. 1.

For example, with reference to FIG. 4, when the battery parallel device 10 is discharging, a current A that flows through the first cylindrical battery 1111A mounted the most closely to the first negative electrode connector 115 flows from the first negative electrode connector 115, flows through a short first distance on the comb parts 1132 of the first negative connector 113, and then flows into the negative electrodes of the first cylindrical battery 1111A. Further, when the current A flows out of the positive electrodes of the first cylindrical battery 1111A, the current A flows through a long second distance on the comb parts 1122 of the first positive connector 112, and then flows to the first positive electrode connector 114.

Besides, a current B that flows through the first cylindrical battery 1111B mounted the most closely to the first positive electrode connector 114 flows from the first negative electrode connector 115, flows through a long third distance on the comb parts 1132 of the first negative connector 113, and then flows into the negative electrodes of the first cylindrical battery 1111B. Further, when the current B flows out of the positive electrodes of the first cylindrical battery 1111B, the current B flows through a short fourth distance on the comb parts 1122 of the first positive connector 112, and then flows to the first positive electrode connector 114.

Since a flowing distance of the current A is a sum of the short first distance and the long second distance, and a flowing distance of the current B is a sum of the long third distance and the short fourth distance, the flowing distance of the current A and the flowing distance of the current B have the same length. Therefore, the parallel structure of the battery parallel device 10 may be balanced to decrease inrush currents, and the life time of the battery parallel device may be extended.

Further, with reference to FIGS. 1 and 2, the first cylindrical batteries 1111 of one of the first battery units 111 are mounted to form two rows, and the first cylindrical batteries 1111 of the two different rows are staggered with each other.

Each of the comb parts 1122 of the first positive connector 112 is a rectangular sheet. Each of the comb parts 1122 of the first positive connector 112 comprises a plurality of welding parts 1123. The welding parts 1123 of one of the comb parts 1122 of the first positive connector 112 are mounted on two opposite sides of said one of the comb parts 1122 of the first positive connector 112, and the welding parts 1123 of the first positive connector 112 are respectively welded at the positive electrodes of the first cylindrical batteries 1111 of one of the first battery units 111.

Each of the comb parts 1122 of the first positive connector 112 respectively comprises an elongate hole 1120. The elongate holes 1120 are respectively formed on the middle of the comb parts 1122 of the first positive connector 112, and are respectively formed along the first direction X to separate the comb parts 1122 of the first positive connector 112 to two opposite sides on which the welding parts 1123 are mounted opposite each other.

Each of the comb parts 1132 of the first negative connector 113 is a rectangular sheet. Each of the comb parts 1132 of the first negative connector 113 comprises a plurality of welding parts 1133.

The welding parts 1133 of one of the comb parts 1132 of the first negative connector 113 are mounted on two opposite sides of said one of the comb parts 1132 of the first negative connector 113, and the welding parts 1133 of the first negative connector 113 are respectively welded at the negative electrodes of the first cylindrical batteries 1111 of one of the first battery units 111.

Each of the comb parts 1132 of the first negative connector 113 respectively comprises an elongate hole 1130. The elongate holes 1130 are respectively formed on the middle of the comb parts 1132 of the first negative connector 113, and are respectively formed along the first direction X to separate the comb parts 1132 of the first negative connector 113 to two opposite sides on which the welding parts 1123 are mounted opposite each other.

Further, the comb parts 1122 of the first positive connector 112 are perpendicular to the connecting part 1121 of the first positive connector 112, and the comb parts 1132 of the first negative connector 113 are perpendicular to the connecting part 1131 of the first negative connector 113.

Since the comb parts 1122 of the first positive connector 112 comprise the elongate holes 1120 to separate the comb parts 1122 of the first positive connector 112 to two opposite sides on which the welding parts 1123 are mounted opposite each other, currents flow from the positive electrodes of the first cylindrical batteries 1111 may be separated by the elongate holes 1120 of the comb parts 1122. The separated currents respectively flow through the comb parts 1122 of the first positive connector 112 separated to two opposite sides on which the welding parts 1123 are mounted. Then, flow directions of the separated currents may be limited, and the separated currents may not flow to the comb parts 1122 on the opposite sides to decrease the inrush currents.

For the same reason, the comb parts 1132 of the first negative connector 113 comprise the elongate holes 1130 to separate the comb parts 1132 of the first negative connector 113 to two opposite sides on which the welding parts 1123 are mounted. Currents flow from the negative electrodes of the first cylindrical batteries 1111 may be separated by the elongate holes 1130 of the comb parts 1132, and the inrush currents may be decreased.

Figure 5:
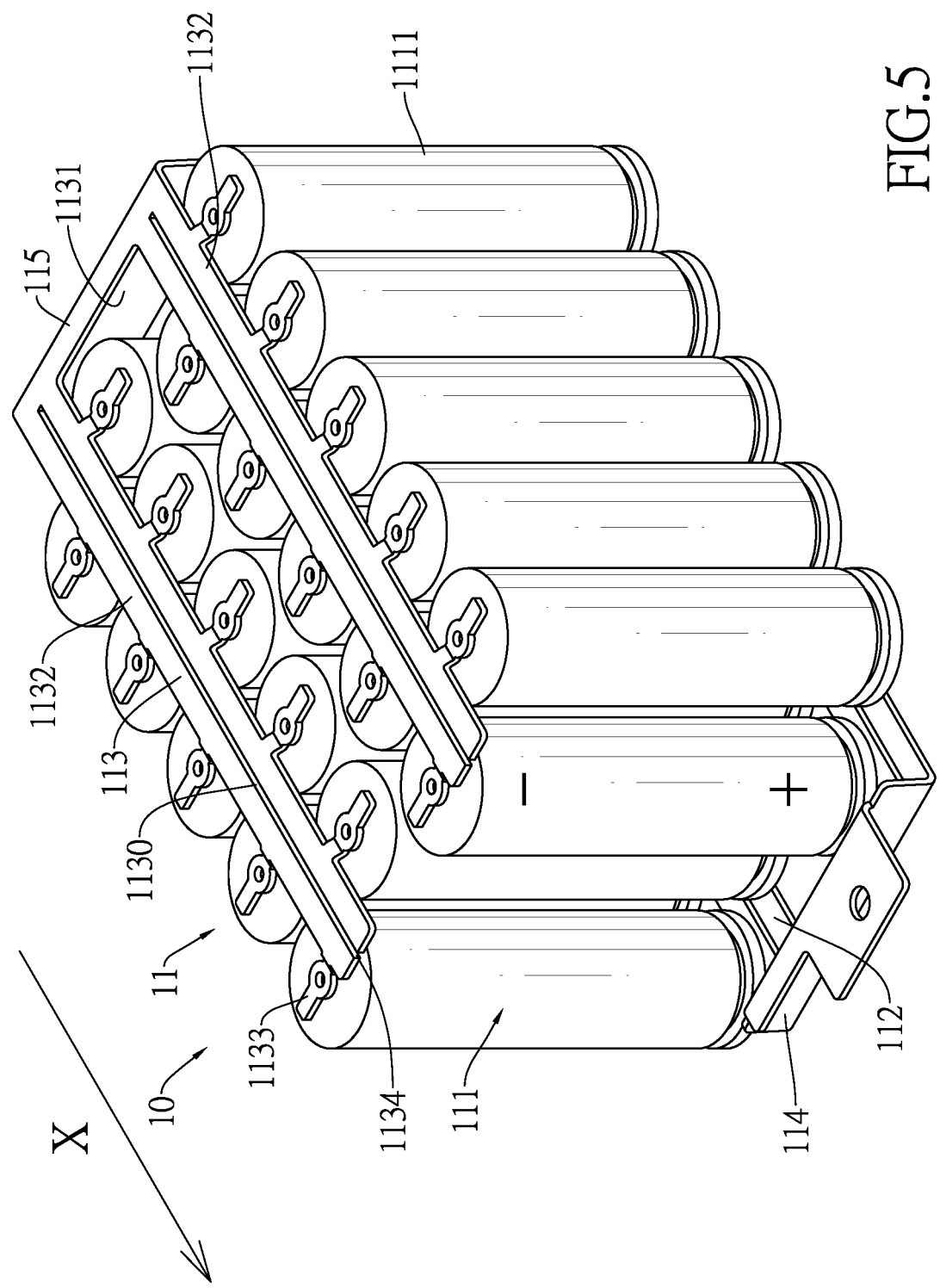
FIG. 5 is a schematic view of another embodiment of a battery parallel device having a charge path and a discharge path with equal impedances.
Figure 6:
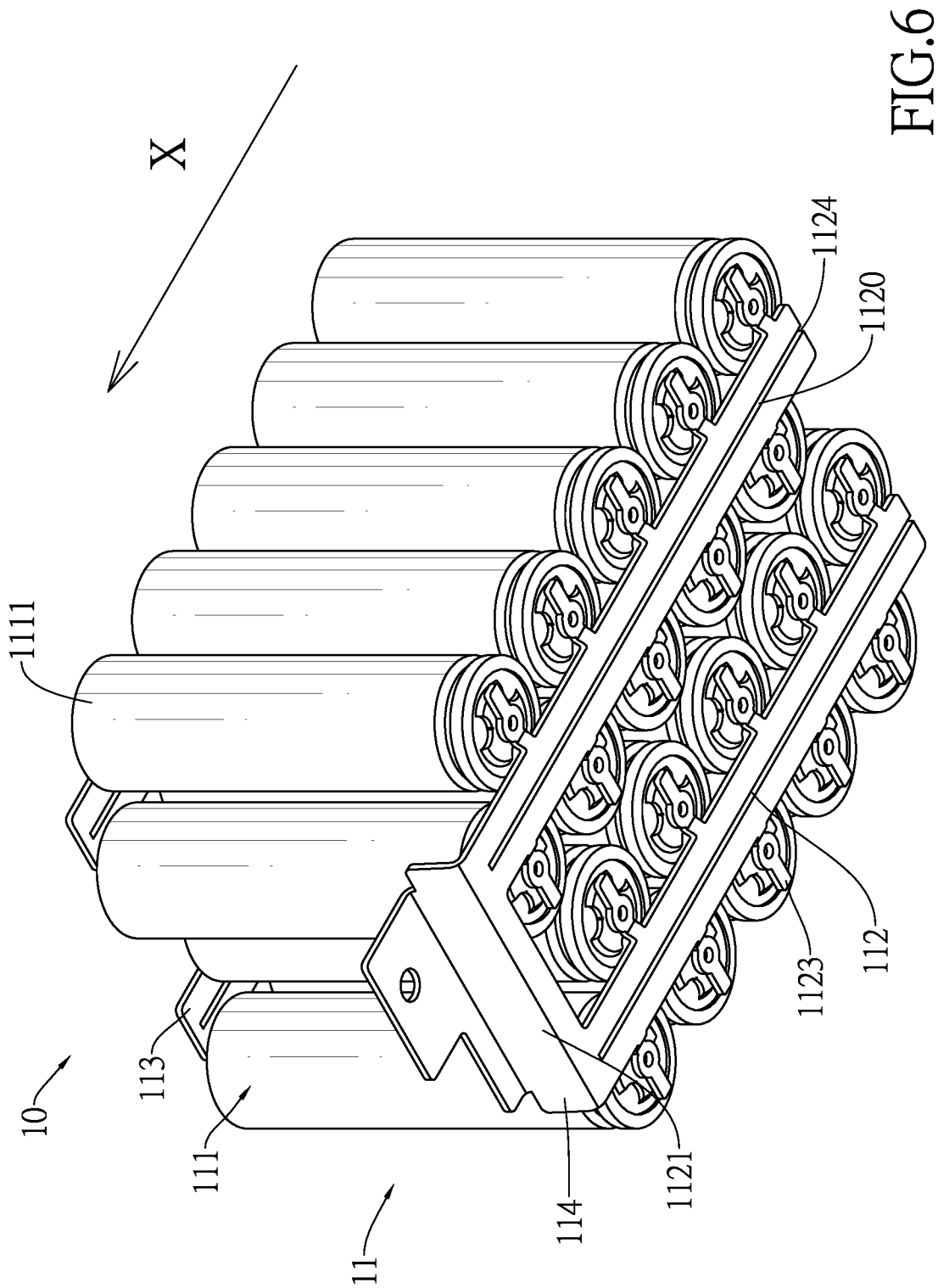
FIG. 6 is another schematic view of the embodiment of the battery parallel device of FIG. 5.

With reference to FIGS. 5 and 6, terminals of the comb parts 1122 of the first positive connector 112 that face a direction opposite to the first direction X each respectively comprise a gap 1124, and the gaps 1124 of the comb parts 1122 of the first positive connector 112 are respectively connected to the elongate holes 1120 of the comb parts 1122 of the first positive connector 112.

Terminals of the comb parts 1132 that face the first direction X each respectively comprise a gap 1134, and the gaps 1134 of the comb parts 1132 of the first negative connector 113 are respectively connected to the elongate holes 1130 of the comb parts 1132 of the first negative connector 113.

Since the gaps 1124 and the gaps 1134 are respectively formed on the comb parts 1122 and the comb parts 1132, flow directions of the currents that flow through the comb parts 1122 and the comb parts 1132 may be further limited, and the inrush current may be further decreased.

Figure 7:
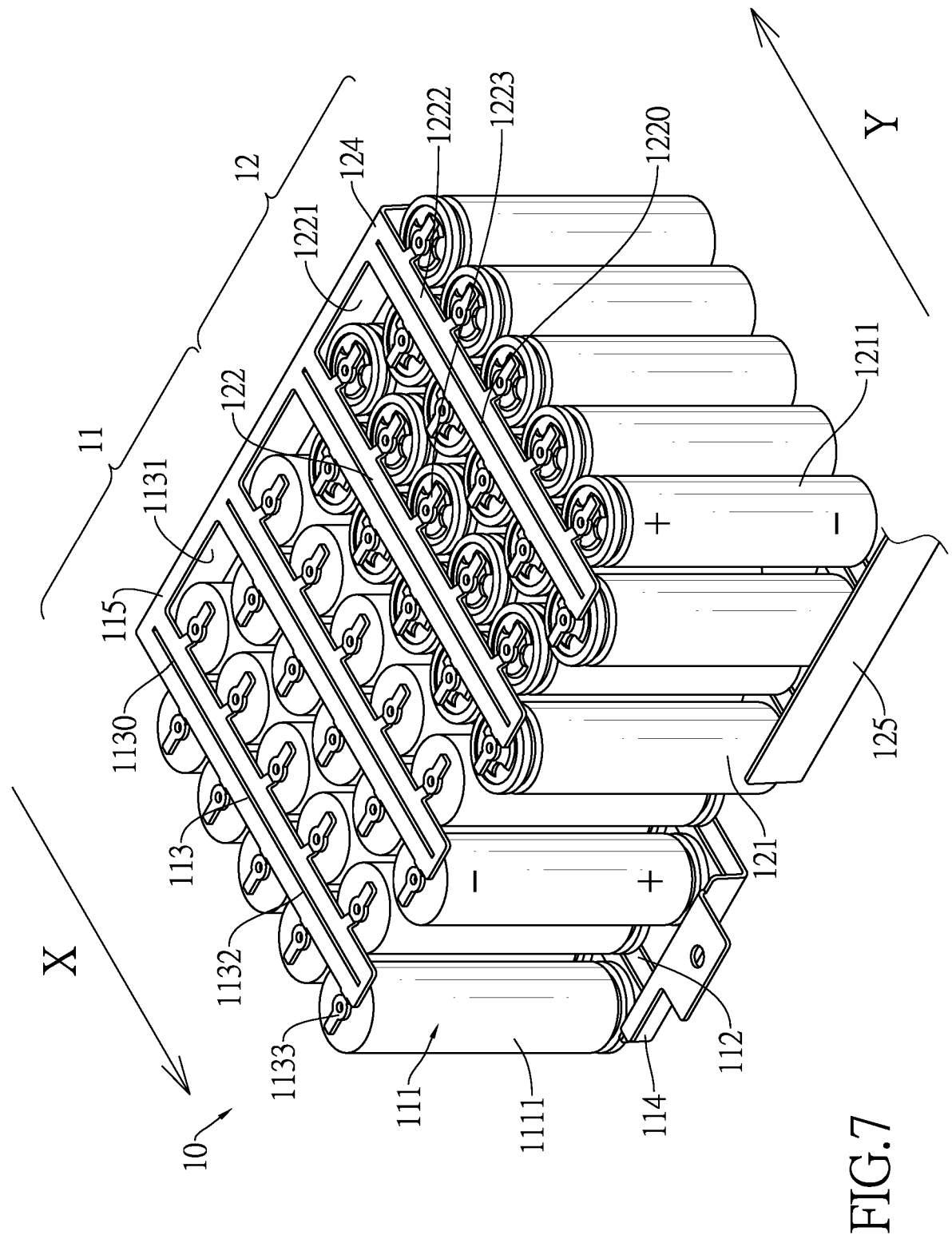
FIG. 7 is a schematic view of still another embodiment of a battery parallel device having a charge path and a discharge path with equal impedances.
Figure 8:
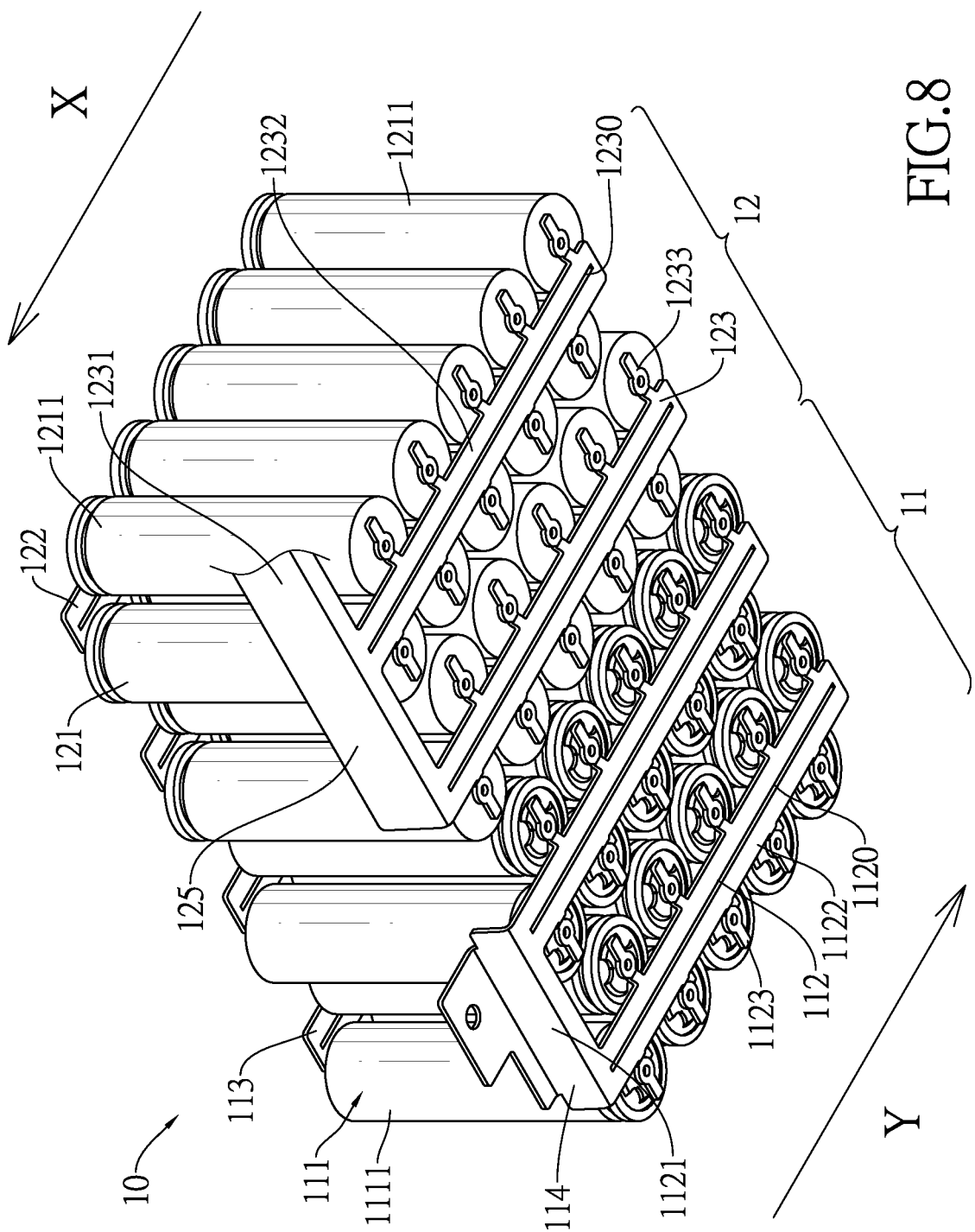
FIG. 8 is another schematic view of the battery parallel device of FIG. 7.

With reference to the FIGS. 7 and 8, the battery parallel device 10 further comprises at least one second parallel apparatus 12. The at least one second parallel apparatus 12 comprises a plurality of second battery units 121, a second positive connector 122, a second negative connector 123, a second positive electrode connector 124, and a second negative electrode connector 125.

Each of the second battery units 121 of the at least one second parallel apparatus 12 comprises a plurality of second batteries, and each of the second batteries comprises a positive electrode and a negative electrode.

The second positive connector 122 is electrically connected to the positive electrodes of the second batteries of the second battery units 121. The second negative connector 123 is electrically connected to the negative electrodes of the second batteries of the second battery units 121.

The second positive electrode connector 124 is formed on a terminal of the second positive connector 122, and a plurality of first current paths are respectively formed between the second positive electrode connector 124 and each of the positive electrodes of the second batteries.

The second negative electrode connector 125 is formed on a terminal of the second negative connector 123, and a plurality of second current paths are respectively formed between the second negative electrode connector 125 and each of the negative electrodes of the second batteries.

Each of the second batteries has a total path length which is a sum of a length of the first current path and a length of the second current path corresponding to the same second battery, and the total path lengths of all of the second batteries are equal.

When the battery parallel device 10 is electrically connected to the load to discharge, flowing lengths of the currents that flow inside the battery parallel device 10 are the same and equal to the total path length. Further, the currents that flow inside the at least one first parallel apparatus 11 have the same flowing length, and the currents that flow inside the at least one second parallel apparatus 12 also have the same flowing length.

Therefore, when the at least one first parallel apparatus 11 and the at least one second parallel apparatus 12 are electrically connected in series, the currents flow through the at least one first parallel apparatus 11 and the at least one second parallel apparatus 12 electrically connected in series, and total lengths of each of the currents that flow through the at least one first parallel apparatus 11 and the at least one second parallel apparatus 12 are the same.

Therefore, parallel structure of the battery parallel device 10 may be balanced to decrease inrush currents, and the life time of the battery parallel device may be extended.

In the embodiment, the second batteries of the second battery units 121 are second cylindrical batteries 1211, and the second cylindrical batteries 1211 are mounted along a second direction Y. The positive electrodes of the second cylindrical batteries 1211 face to the same direction, and the second battery units 121 are separated from each other.

The second positive connector 122 comprises a connecting part 1221 and a plurality of comb parts 1222. The comb parts 1222 are separated from each other, and are mounted along the second direction Y. Terminals of the comb parts 1222 that face the second direction Y are connected with the connecting part 1221, and the comb parts 1222 are respectively electrically connected to the positive electrodes of the second cylindrical batteries 1211 of one of the second battery units 121.

The second negative connector 123 comprises a connecting part 1231 and a plurality of comb parts 1232. The comb parts 1232 of the second negative connector 123 are separated from each other, and are mounted along the second direction Y. Terminals of the comb parts 1232 of the second negative connector 123 that face a direction opposite to the second direction Y are connected with the connecting part 1231 of the second negative connector 123, and the comb parts 1232 of the second negative connector 123 are respectively electrically connected to the negative electrodes of the second cylindrical batteries 1211 of one of the second battery units 121.

The second positive electrode connector 124 is formed on the connecting part 1221 of the second positive connector 122. The second negative electrode connector 125 is formed on the connecting part 1231 of the second negative connector 123.

Further, the second positive electrode connector 124 of the at least one second parallel apparatus 12 is electrically connected to the first negative electrode connector 115 of the at least one first parallel apparatus 11. In the embodiment, the connecting part 1221 of the second positive connector 122 of the at least one second parallel apparatus 12 and the connecting part 1131 of the first negative connector 113 of the at least one first parallel apparatus 11 are integrally formed.

The at least one first parallel apparatus 11 and the at least one second parallel apparatus 12 may be electrically connected in series, and total lengths of each of the currents that flow through the at least one first parallel apparatus 11 and the at least one second parallel apparatus 12 are still the same. Then, the battery parallel device 10 may have various different designs for different needs, and output voltage of the battery parallel device 10 may be changed by electrically connecting the at least one first parallel apparatus 11 and the at least one second parallel apparatus 12 in series or in parallel.

Besides, the parallel structure of the battery parallel device 10 may also be balanced to decrease inrush currents, and the life time of the battery parallel device 10 may be extended.

Figure 9:
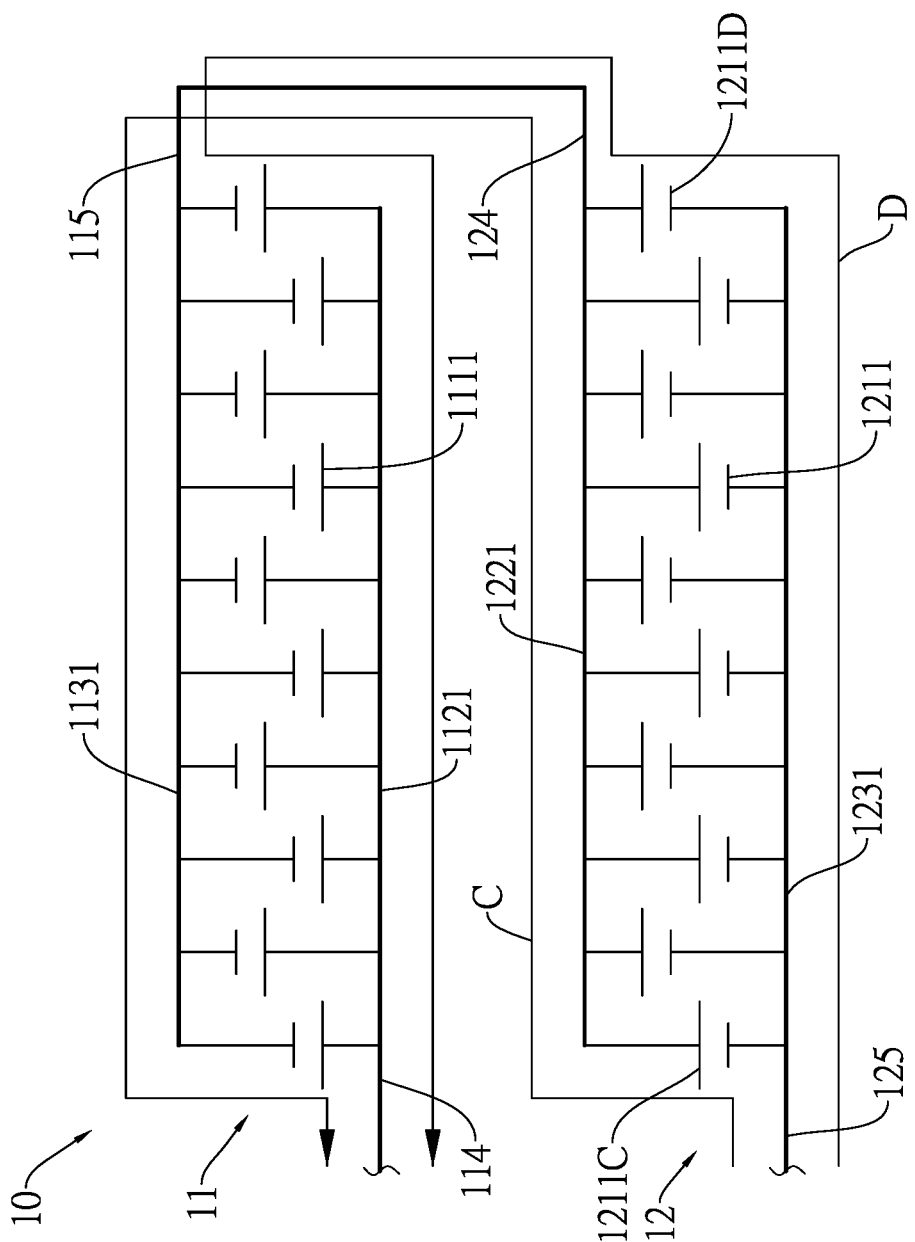
FIG. 9 is a schematic circuit diagram of the battery parallel device of FIG. 7.

For example, with reference to FIG. 9, when the battery parallel device 10 is discharging, a current C that flows through the second cylindrical battery 1211C mounted most closely to the second negative electrode connector 125 flows from the second negative electrode connector 125, flows through a short first distance on the comb parts 1232 of the second negative connector 123, and then flows into the negative electrodes of the second cylindrical battery 1211C. Further, when the current C flows out of the positive electrodes of the second cylindrical battery 1211C, the current C flows through a long second distance on the comb parts 1222 of the second positive connector 122, and then flows to the second positive electrode connector 124. Further, the current C flows into the first negative electrode connector 115 of the at least one first parallel apparatus 11.

When the current C flows into the at least one first parallel apparatus 11, the total path lengths that the current C flows through the at least one first parallel apparatus 11 by different paths are the same.

Besides, a current D that flows through the second cylindrical battery 1211D mounted the most closely to the second positive electrode connector 124 flows from the second negative electrode connector 125, flows through a long third distance on the comb parts 1232 of the second negative connector 123, and then flows into the negative electrodes of the second cylindrical battery 1211D. Further, when the current D flows out of the positive electrodes of the second cylindrical battery 1211D, the current D flows through a short fourth distance on the comb parts 1222 of the second positive connector 122, and then flows to the second positive electrode connector 124. Further, the current D flows into the first negative electrode connector 115 of the at least one first parallel apparatus 11.

When the current D flows into the at least one first parallel apparatus 11, the total path lengths that the current D flows through the at least one first parallel apparatus 11 by different paths are the same.

For the same reason, the current C and the current D may have the same path length when the current C and the current D flow through the at least one second parallel apparatus 12.

Then, when the current C and the current D flow into the first negative electrode connector 115, the current C and the current D may still have the same path length in the at least one first parallel apparatus 11.

Therefore, the parallel structure of the battery parallel device 10 may be balanced to decrease inrush currents, and the life time of the battery parallel device may be extended.

Further, with reference to FIGS. 7 and 8, the second cylindrical batteries 1211 of one of the second battery units 121 are mounted to form two rows, and the second cylindrical batteries 1211 of the two different rows are staggered with each other.

Each of the comb parts 1222 of the second positive connector 122 is a rectangular sheet. Each of the comb parts 1222 of the second positive connector 122 comprises a plurality of welding parts 1223. The welding parts 1223 of one of the comb parts 1222 of the second positive connector 122 are mounted on two opposite sides of said one of the comb parts 1222 of the second positive connector 122, and the welding parts 1223 of the second positive connector 122 are respectively welded at the positive electrodes of the second cylindrical batteries 1211 of one of the second battery units 121.

Each of the comb parts 1222 of the second positive connector 122 respectively comprises an elongate hole 1220. The elongate holes 1220 are respectively formed on the middle of the comb parts 1222 of the second positive connector 122, and are respectively formed along the second direction Y to separate the comb parts 1222 of the second positive connector 122 to two opposite sides on which the welding parts 1223 are mounted opposite each other.

Each of the comb parts 1232 of the second negative connector 123 is a rectangular sheet. Each of the comb parts 1232 of the second negative connector 123 comprises a plurality of welding parts 1233.

The welding parts 1233 of one of the comb parts 1232 of the second negative connector 123 are mounted on two opposite sides of said one of the comb parts 1232 of the second negative connector 123, and the welding parts 1233 of the second negative connector 123 are respectively welded at the negative electrodes of the second cylindrical batteries 1211 of one of the second battery units 121.

Each of the comb parts 1232 of the second negative connector 123 respectively comprises an elongate hole 1230. The elongate holes 1230 are respectively formed on the middle of the comb parts 1232 of the second negative connector 123, and are respectively mounted along the second direction Y to separate the comb parts 1232 of the second negative connector 123 to two opposite sides on which the welding parts 1233 are mounted opposite each other.

Further, the comb parts 1222 of the second positive connector 122 are perpendicular to the connecting part 1221 of the second positive connector 122, and the comb parts 1232 of the second negative connector 123 are perpendicular to the connecting part 1231 of the second negative connector 123.

For the same reason mentioned above, currents flow from the positive electrodes of the second cylindrical batteries 1211 may be separated by the elongate holes 1220 of the comb parts 1222, and flow directions of the separated currents may be limited to decrease the inrush currents.

Further, currents flow from the negative electrodes of the second cylindrical batteries 1211 may be separated by the elongate holes 1230 of the comb parts 1232, and the inrush currents may be decreased.

Besides, terminals of the comb parts 1222 of the second positive connector 122 that face a direction opposite to the second direction Y each respectively comprise a gap (not shown), and the gaps of the comb parts 1222 of the second positive connector 122 are respectively connected to the elongate holes 1220 of the comb parts 1222 of the second positive connector 122.

Terminals of the comb parts 1232 of the second negative connector 123 that face the second direction Y each respectively comprise a gap (not shown), and the gaps of the comb parts 1232 of the second negative connector 123 are respectively connected to the elongate holes 1230 of the comb parts 1232 of the second negative connector 123.

Since the gaps of the comb parts 1232 of the second negative connector 123 and the gaps of the comb parts 1222 of the second positive connector 122 are respectively formed on the comb parts 1232 of the second negative connector 123 and the comb parts 1222 of the second positive connector 122, flow directions of the currents that flow through the comb parts 1232 of the second negative connector 123 and the comb parts 1222 of the second positive connector 122 may be further limited, and the inrush current may be further decreased.

Figure 10:
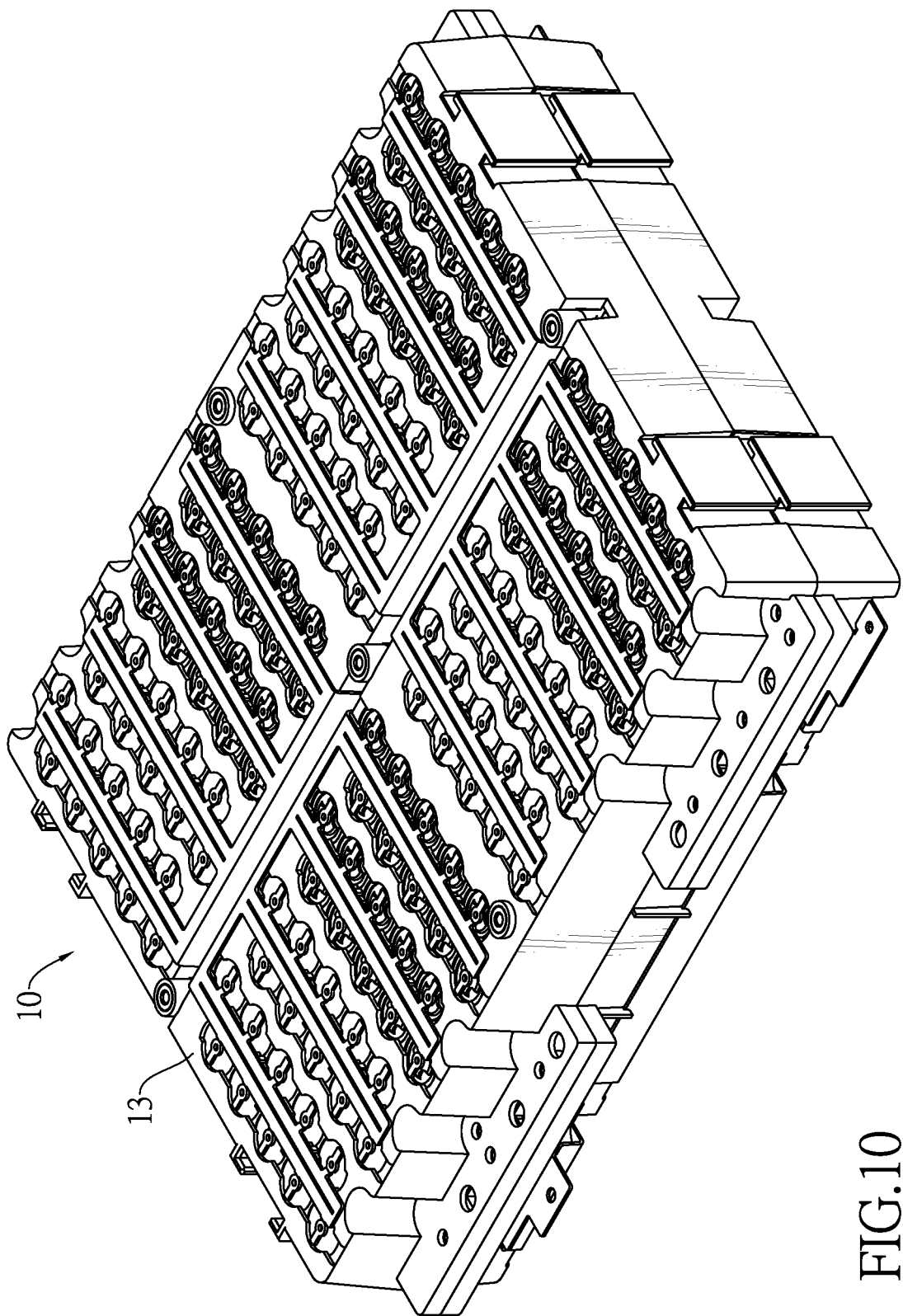
FIG. 10 is a schematic view of further another embodiment of a battery parallel device having charge a path and a discharge path with equal impedances.
Figure 11:
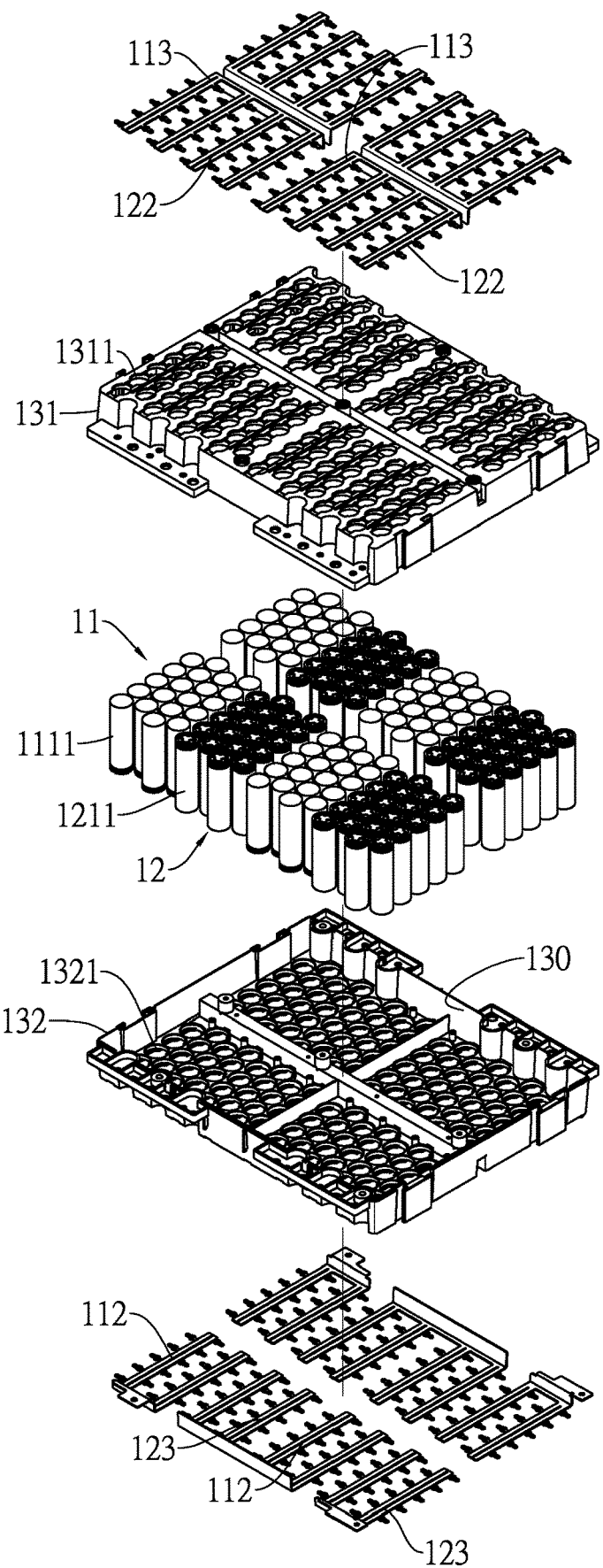
FIG. 11 is an exploded perspective view of the battery parallel device of FIG. 10.

With reference to FIGS. 10 and 11, the battery parallel device 10 further comprises a shell 13. The shell 13 comprises a containing space 130, a first half shell 131, a second half shell 132, a plurality of first battery electrode openings 1311, and a plurality of second battery electrode openings 1321. The shell 13 is consisted of the first half shell 131 and the second half shell 132. The first battery electrode openings 1311 are formed on a wall of the first half shell 131. The second battery electrode openings 1321 are formed on a wall of the second half shell 132 that is opposite to the wall having the first battery electrode openings 1311.

The first cylindrical batteries 1111 of the first battery units 111 of the at least one first parallel apparatus 11 and the second cylindrical batteries 1211 of the second battery units 121 of the at least one second parallel apparatus 12 are mounted in the containing space 130 of the shell 13. The positive electrodes of the first cylindrical batteries 1111 are respectively mounted in the first battery electrode openings 1311 of the shell 13, and the negative electrodes of the second cylindrical batteries 1211 are respectively mounted in the second battery electrode openings 1321 of the shell 13.

The first positive connector 112 of the at least one first parallel apparatus 11 is mounted out of the second half shell 132 and electrically connected to the positive electrodes of the first cylindrical batteries 1111 through the second battery electrode openings 1321.

The first negative connector 113 of the at least one first parallel apparatus 11 is mounted out of the first half shell 131 and electrically connected to the negative electrodes of the first cylindrical batteries 1111 through the first battery electrode openings 1311.

Further, the second positive connector 122 of the at least one second parallel apparatus 12 is mounted out of the first half shell 131 and electrically connected to the positive electrodes of the second cylindrical batteries 1211 through the first battery electrode openings 1311.

The second negative connector 123 of the at least one second parallel apparatus 12 is mounted out of the second half shell 132 and electrically connected to the negative electrodes of the second cylindrical batteries 1211 through the second battery electrode openings 1321.

Besides, the second positive electrode connector 124 of the at least one second parallel apparatus 12 is electrically connected to the first negative electrode connector 115 of the at least one first parallel apparatus 11.

Therefore, the battery parallel device 10 may have various different designs for different needs, and output voltage of the battery parallel device 10 may be changed by electrically connecting the at least one first parallel apparatus 11 and the at least one second parallel apparatus 12 in series or in parallel. In the meantime, the inrush current may be decreased, and the life time of the battery parallel device 10 may be extended.

Figure 12:
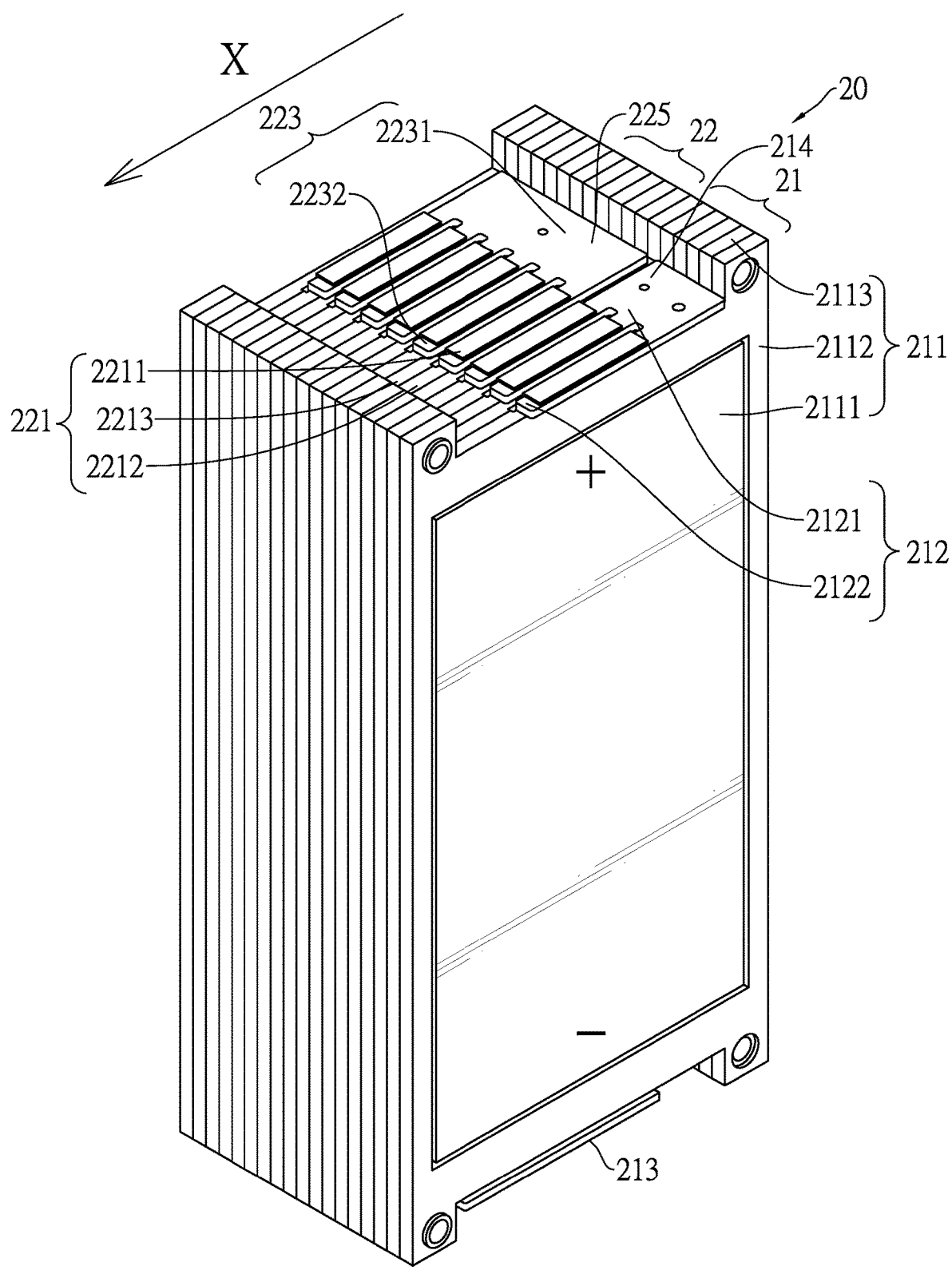
FIG. 12 is a schematic view of yet another embodiment of a battery parallel device having a charge path and a discharge path with equal impedances.
Figure 13:
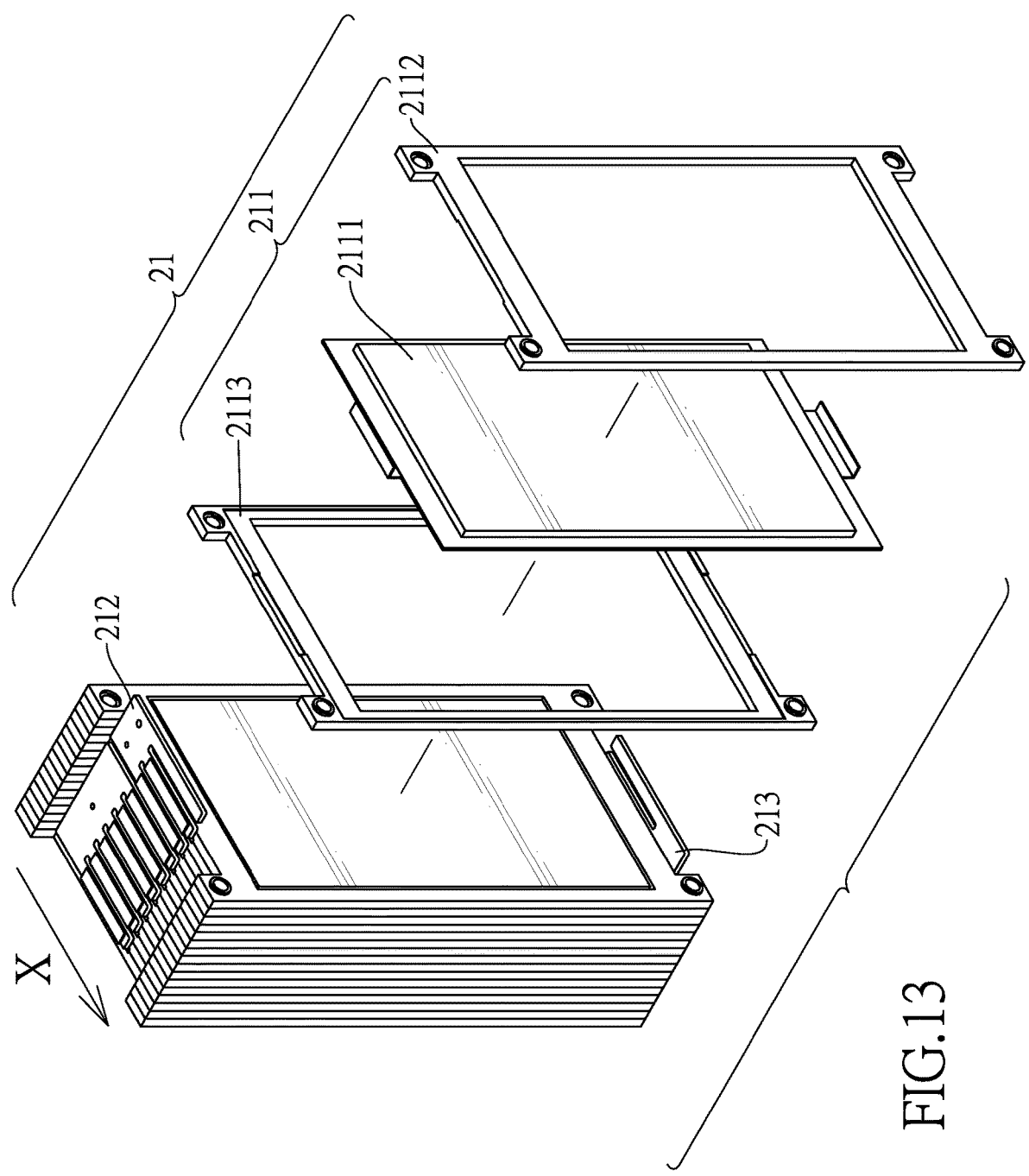
FIG. 13 is an exploded view of the battery parallel device of FIG. 12.
Figure 14:
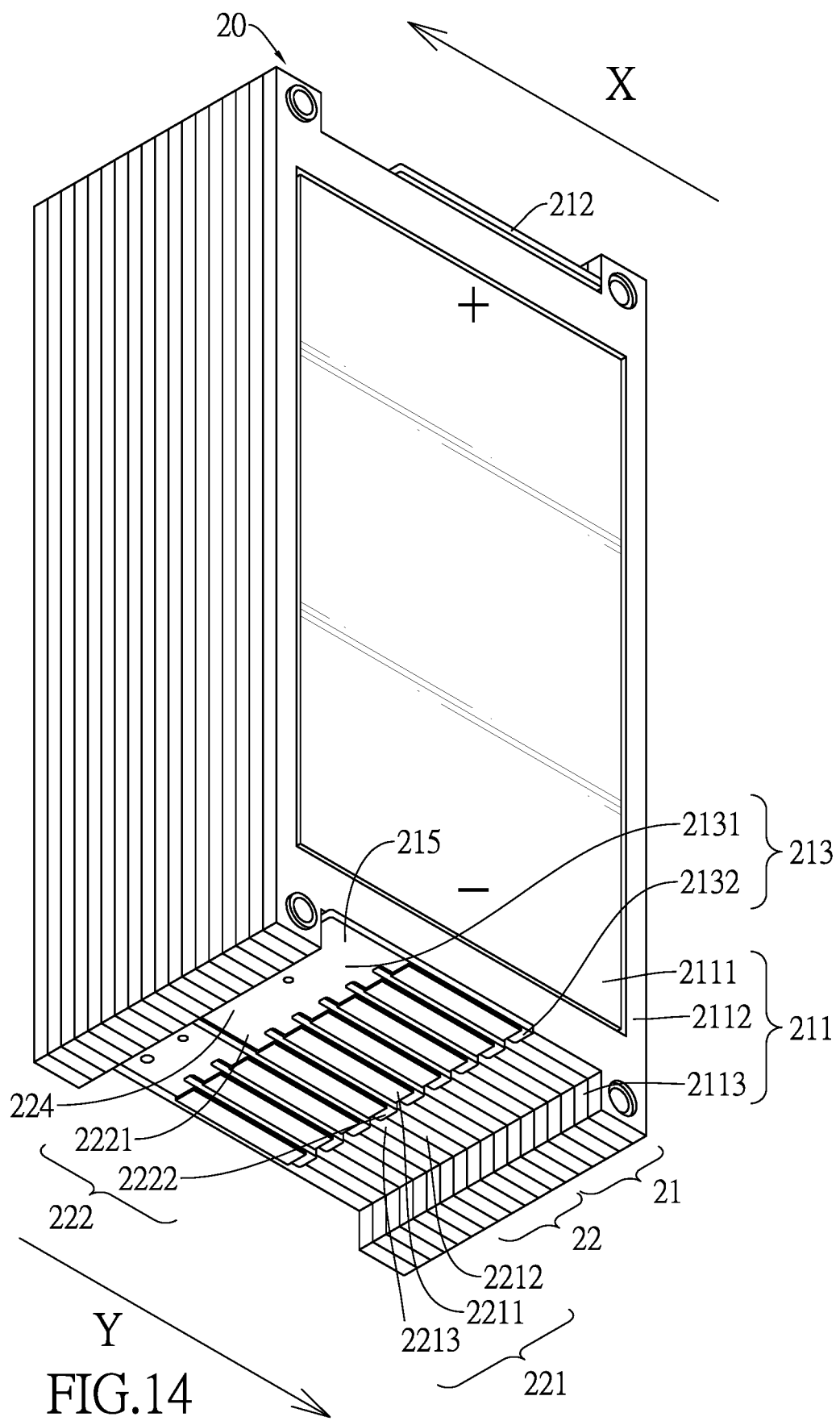
FIG. 14 is another schematic view of the battery parallel device of FIG. 12.
Figure 15:
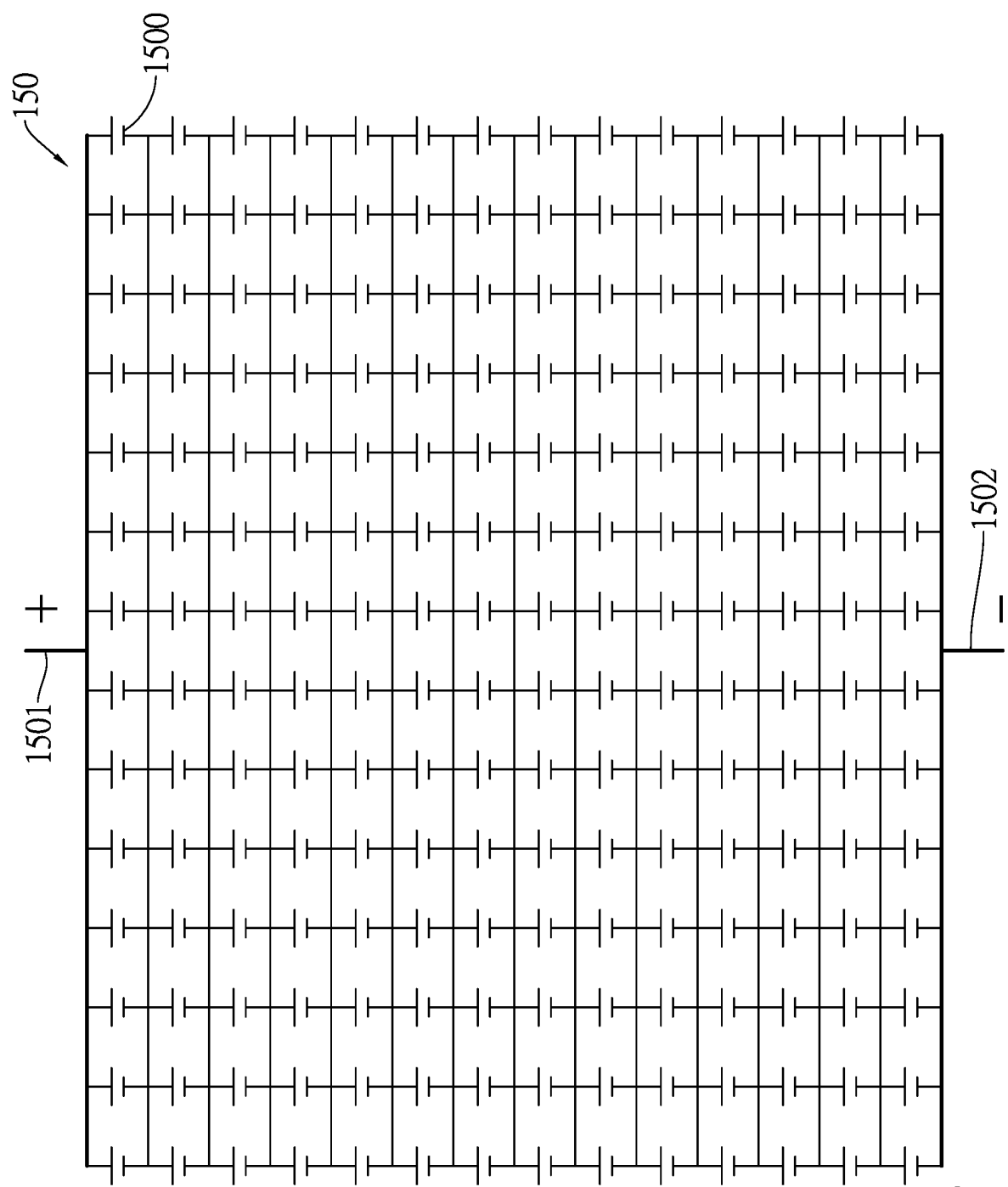
FIG. 15 is circuit diagram of a conventional battery set.

With reference to FIGS. 12, 13, and 14, in another embodiment, the battery parallel device 20 comprises at least one first parallel apparatus 21. The at least one first parallel apparatus 21 comprises a plurality of first battery units 211, a first positive connector 212, a first negative connector 213, a first positive electrode connector 214, and a first negative electrode connector 215.

Each of the first battery units 211 is a pouch type battery, and comprises a battery core 2111, a first shell 2112, and a second shell 2113. The battery core 2111 is mounted between the first shell 2112 and the second shell 2113. Each of the battery cores 2111 of the first battery units 211 comprises a positive electrode and a negative electrode, and the positive electrodes of the battery cores 2111 face the same direction.

The first positive connector 212 comprises a connecting part 2121 and a plurality of comb parts 2122. The comb parts 2122 are separated from each other, and are mounted along a first direction X. Terminals of the comb parts 2122 that face the first direction X are connected with the connecting part 2121, and the comb parts 2122 are respectively electrically connected to the positive electrodes of the battery core 2111 of one of the first battery units 211.

The first negative connector 213 comprises a connecting part 2131 and a plurality of comb parts 2132. The comb parts 2132 of the first negative connector 213 are separated from each other, and are mounted along the first direction X. Terminals of the comb parts 2132 of the first negative connector 213 that face a direction opposite to the first direction X are connected with the connecting part 2131 of the first negative connector 213, and the comb parts 2132 of the first negative connector 213 are respectively electrically connected to the negative electrodes of the battery cores 2111 of one of the first battery units 211.

The first positive electrode connector 214 is formed on the connecting part 2121 of the first positive connector 212.

The first negative electrode connector 215 is formed on the connecting part 2131 of the first negative connector 213.

When the battery parallel device 20 is electrically connected to the load to discharge, the currents flowing inside the battery parallel device 20 flows from the first negative electrode connector 215 to the first positive electrode connector 214. According to the above, path lengths of the currents inside the battery parallel device 20 which are respectively flowing through different first battery units 211 are the same. Therefore, parallel structure of the battery parallel device 10 may be balanced, and the life time of the battery parallel device 20 may be extended.

The battery parallel device 20 further comprises at least one second parallel apparatus 22. The at least one second parallel apparatus 22 comprises a plurality of second battery units 221, a second positive connector 222, a second negative connector 223, a second positive electrode connector 224, and a second negative electrode connector 225.

Each of the second battery units 221 is a pouch type battery, and comprises a battery core 2211, a first shell 2212, and a second shell 2213. The battery core 2211 is mounted between the first shell 2212 and the second shell 2213. Each of the battery cores 2211 of the second battery units 221 comprises a positive electrode and a negative electrode, and the positive electrodes of the battery cores 2211 of the second battery units 221 face the same direction.

The second positive connector 222 comprises a connecting part 2221 and a plurality of comb parts 2222. The comb parts 2222 of the second positive connector 222 are separated from each other, and are mounted along a second direction Y. Terminals of the comb parts 2222 of the second positive connector 222 that face the second direction Y are connected with the connecting part 2221 of the second positive connector 222, and the comb parts 2222 of the second positive connector 222 are respectively electrically connected to the positive electrodes of the battery cores 2211 of one of the second battery units 221.

The second negative connector 223 comprises a connecting part 2231 and a plurality of comb parts 2232. The comb parts 2232 of the second negative connector 223 are separated from each other, and are mounted along the second direction Y. Terminals of the comb parts 2232 of the second negative connector 223 that face a direction opposite to the second direction Y are connected with the connecting part 2231 of the second negative connector 223, and the comb parts 2232 of the second negative connector 223 are respectively electrically connected to the negative electrodes of the battery cores 2211 of one of the second battery units 221.

The second positive electrode connector 224 is formed on the connecting part 2221 of the second positive connector 222.

The second negative electrode connector 225 is formed on the connecting part 2231 of the second negative connector 223.

The second positive electrode connector 224 of the at least one second parallel apparatus 22 is electrically connected to the first negative electrode connector 215 of the at least one first parallel apparatus 21.

In the embodiment, the connecting part 2221 of the second positive connector 222 of the at least one second parallel apparatus 22 and the connecting part 2131 of the first negative connector 213 of the at least one first parallel apparatus 21 are integrally formed.

The at least one first parallel apparatus 21 and the at least one second parallel apparatus 22 may be electrically connected in series, and total lengths of each of the currents that flow through the at least one first parallel apparatus 21 and the at least one second parallel apparatus 22 are still the same. Then, the battery parallel device 20 may have various different designs for different needs, and output voltage of the battery parallel device 20 may be changed by electrically connecting the at least one first parallel apparatus 21 and the at least one second parallel apparatus 22 in series or in parallel.

Besides, the parallel structure of the battery parallel device 20 may also be balanced to decrease inrush currents, and the life time of the battery parallel device 20 may be extended.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A battery parallel device having a charge path and a discharge path with equal impedances, comprising:
   at least one first parallel apparatus, comprising:
      a plurality of first battery units; wherein each of the first battery units comprises a plurality of first batteries, and each of the first batteries comprises a positive electrode and a negative electrode;
      a first positive connector, electrically connected to the positive electrodes of the first batteries of the first battery units;
      a first negative connector, electrically connected to the negative electrodes of the first batteries of the first battery units;
      a first positive electrode connector, formed on a terminal of the first positive connector;
      a plurality of first current paths, respectively formed between the first positive electrode connector and each of the positive electrodes of the first batteries;
      a first negative electrode connector, formed on a terminal of the first negative connector; and
      a plurality of second current paths, respectively formed between the first negative electrode connector and each of the negative electrodes of the first batteries;
      wherein each of the first batteries has a total path length that is a sum of a length of the first current path and a length of the second current path corresponding to the same first battery, and the total path lengths of all of the first batteries are equal;
      wherein the first batteries of the first battery units of the at least one first parallel apparatus are first cylindrical batteries, and the first cylindrical batteries are mounted along a first direction;
   the positive electrodes of the first cylindrical batteries face to the same direction, and the first battery units are separated from each other;
   the first positive connector comprises:
      a connecting part; and
      a plurality of comb parts, separated from each other, and mounted along the first direction; wherein terminals of the comb parts that face the first direction are connected with the connecting part, and the comb parts are respectively electrically connected to the positive electrodes of the first cylindrical batteries of one of the first battery units;
   the first negative connector comprises:
      a connecting part; and
      a plurality of comb parts, separated from each other, and mounted along the first direction; wherein terminals of the comb parts of the first negative connector that face a direction opposite to the first direction are connected with the connecting part of the first negative connector, and the comb parts of the first negative connector are respectively electrically connected to the negative electrodes of the first cylindrical batteries of one of the first battery units;
   the first positive electrode connector is formed on the connecting part of the first positive connector; and
   the first negative electrode connector is formed on the connecting part of the first negative connector.

2. The battery parallel device as claimed in claim 1, wherein:
   the length of each of the first current paths is a distance between the first positive electrode connector and each of the first batteries, and the first current paths corresponding to the respective first batteries are different; and the length of each of the second current paths is a distance between the first negative electrode connector and each of the first batteries, and the second current paths corresponding to the respective first batteries are different.

3. The battery parallel device as claimed in claim 1, wherein:
the first cylindrical batteries of one of the first battery units of the at least one first parallel apparatus are mounted to form two rows, and the first cylindrical batteries of the two different rows are staggered with each other;
each of the comb parts of the first positive connector is a rectangular sheet, and each of the comb parts of the first positive connector comprises a plurality of welding parts;
the welding parts of one of the comb parts of the first positive connector are mounted on two opposite sides of said one of the comb parts of the first positive connector, and the welding parts of the first positive connector are respectively welded at the positive electrodes of the first cylindrical batteries of one of the first battery units;
each of the comb parts of the first positive connector respectively comprises an elongate hole;
the elongate holes are respectively formed on the middle of the comb parts of the first positive connector, and are respectively formed along the first direction to separate the comb parts of the first positive connector to two opposite sides on which the welding parts are mounted opposite each other;
each of the comb parts of the first negative connector is a rectangular sheet, and each of the comb parts of the first negative connector comprises a plurality of welding parts;
the welding parts of one of the comb parts of the first negative connector are mounted on two opposite sides of said one of the comb parts of the first negative connector, and the welding parts of the first negative connector are respectively welded at the negative electrodes of the first cylindrical batteries of one of the first battery units;
each of the comb parts of the first negative connector respectively comprises an elongate hole; and
the elongate holes are respectively formed on the middle of the comb parts of the first negative connector, and are respectively formed along the first direction to separate the comb parts of the first negative connector to two opposite sides on which the welding parts are mounted opposite each other.

4. The battery parallel device as claimed in claim 1, wherein:
the comb parts of the first positive connector are perpendicular to the connecting part of the first positive connector; and
the comb parts of the first negative connector are perpendicular to the connecting part of the first negative connector.

5. The battery parallel device as claimed in claim 1, further comprising:
at least one second parallel apparatus, comprising:
a plurality of second battery units; wherein each of the second battery units comprises a plurality of second batteries, and each of the second batteries comprises a positive electrode and a negative electrode;
a second positive connector, electrically connected to the positive electrodes of the second batteries of the second battery units;
a second negative connector, electrically connected to the negative electrodes of the second batteries of the second battery units;
a second positive electrode connector, formed on a terminal of the second positive connector;
a plurality of first current paths, respectively formed between the second positive electrode connector and each of the positive electrodes of the second batteries;
a second negative electrode connector, formed on a terminal of the second negative connector; and
a plurality of second current paths, respectively formed between the second negative electrode connector and each of the negative electrodes of the second batteries;
wherein each of the second batteries has a total path length which is a sum of a length of the first current path and a length of the second current path corresponding to the same second battery, and the total path lengths of all of the second batteries are equal.

6. The battery parallel device as claimed in claim 5, wherein:
the second batteries of the second battery units of the at least one second parallel apparatus are second cylindrical batteries, and the second cylindrical batteries are mounted along a second direction;
the positive electrodes of the second cylindrical batteries face to the same direction, and the second battery units are separated from each other;
the second positive connector comprises:
a connecting part; and
a plurality of comb parts, separated from each other, and mounted along the second direction; wherein terminals of the comb parts that face the second direction are connected with the connecting part, and the comb parts are respectively electrically connected to the positive electrodes of the second cylindrical batteries of one of the second battery units;
the second negative connector comprises:
a connecting part; and
a plurality of comb parts, separated from each other, and mounted along the second direction; wherein terminals of the comb parts of the second negative connector that face a direction opposite to the second direction are connected with the connecting part of the second negative connector, and the comb parts of the second negative connector are respectively electrically connected to the negative electrodes of the second cylindrical batteries of one of the second battery units;
the second positive electrode connector is formed on the connecting part of the second positive connector; and
the second negative electrode connector is formed on the connecting part of the second negative connector.

7. The battery parallel device as claimed in claim 6, wherein the connecting part of the second positive connector of the at least one second parallel apparatus and the connecting part of the first negative connector of the at least one first parallel apparatus are integrally formed.

8. The battery parallel device as claimed in claim 6, wherein:
the second cylindrical batteries of one of the second battery units of the at least one second parallel apparatus are mounted to form two rows, and the second cylindrical batteries of the two different rows are staggered with each other;

each of the comb parts of the second positive connector is a rectangular sheet, and each of the comb parts of the second positive connector comprises a plurality of welding parts;

the welding parts of one of the comb parts of the second positive connector are mounted on two opposite sides of said one of the comb parts of the second positive connector, and the welding parts of the second positive connector are respectively welded at the positive electrodes of the second cylindrical batteries of one of the second battery units;

each of the comb parts of the second positive connector respectively comprises an elongate hole;

the elongate holes are respectively formed on the middle of the comb parts of the second positive connector, and are respectively formed along the second direction to separate the comb parts of the second positive connector to two opposite sides on which the welding parts are mounted opposite each other;

each of the comb parts of the second negative connector is a rectangular sheet, and each of the comb parts of the second negative connector comprises a plurality of welding parts;

the welding parts of one of the comb parts of the second negative connector are mounted on two opposite sides of said one of the comb parts of the second negative connector, and the welding parts of the second negative connector are respectively welded at the negative electrodes of the second cylindrical batteries of one of the second battery units;

each of the comb parts of the second negative connector respectively comprises an elongate hole; and the elongate holes are respectively formed on the middle of the comb parts of the second negative connector, and are respectively mounted along the second direction to separate the comb parts of the second negative connector to two opposite sides on which the welding parts are mounted opposite each other.

9. The battery parallel device as claimed in claim 8, wherein:
terminals of the comb parts of the second positive connector that face a direction opposite to the second direction each respectively comprise a gap, and the gaps of the comb parts of the second positive connector are respectively connected to the elongate holes of the comb parts of the second positive connector; and
the terminals of the comb parts of the second negative connector that face the second direction each respectively comprise a gap, and the gaps of the comb parts of the second negative connector are respectively connected to the elongate holes of the comb parts of the second negative connector.

10. The battery parallel device as claimed in claim 6, wherein:
the comb parts of the second positive connector are perpendicular to the connecting part of the second positive connector; and
the comb parts of the second negative connector are perpendicular to the connecting part of the second negative connector.

11. The battery parallel device as claimed in claim 6, further comprising:
a shell, comprising:
a containing space;
a first half shell;
a second half shell, connecting with the first half shell to form the shell;
a plurality of first battery electrode openings, formed on a wall of the first half shell; and
a plurality of second battery electrode openings, formed on a wall that is opposite to the wall having the first battery electrode openings;
wherein the first cylindrical batteries of the first battery units of the at least one first parallel apparatus and the second cylindrical batteries of the second battery units of the at least one second parallel apparatus are mounted in the containing space of the shell;
wherein the positive electrodes of the first cylindrical batteries are respectively mounted in the first battery electrode openings of the shell;
wherein the negative electrodes of the second cylindrical batteries are respectively mounted in the second battery electrode openings of the shell;
wherein the second positive connector of the at least one second parallel apparatus is mounted out of the first half shell and electrically connected to the positive electrodes of the second cylindrical batteries through the first battery electrode openings;
wherein the first negative connector of the at least one first parallel apparatus is mounted out of the first half shell and electrically connected to the negative electrodes of the first cylindrical batteries through the first battery electrode openings;
wherein the second positive connector of the at least one second parallel apparatus is mounted out of the first half shell and electrically connected to the positive electrodes of the second cylindrical batteries through the first battery electrode openings; and
wherein the second negative connector of the at least one second parallel apparatus is mounted out of the second half shell and electrically connected to the negative electrodes of the second cylindrical batteries through the second battery electrode openings.

12. The battery parallel device as claimed in claim 3, wherein:
terminals of the comb parts of the first positive connector that face a direction opposite to the first direction each respectively comprise a gap, and the gaps of the comb parts of the first positive connector are respectively connected to the elongate holes of the comb parts of the first positive connector; and
the terminals of the comb parts that face the first direction each respectively comprise a gap, and the gaps of the comb parts of the first negative connector are respectively connected to the elongate holes of the comb parts of the first negative connector.

13. The battery parallel device as claimed in claim 12, further comprising:
at least one second parallel apparatus, comprising:
a plurality of second battery units; wherein each of the second battery units comprises a plurality of second batteries, and each of the second batteries comprises a positive electrode and a negative electrode;
a second positive connector, electrically connected to the positive electrodes of the second batteries of the second battery units;
a second negative connector, electrically connected to the negative electrodes of the second batteries of the second battery units;

a second positive electrode connector, formed on a terminal of the second positive connector;
a plurality of first current paths, respectively formed between the second positive electrode connector and each of the positive electrodes of the second batteries;
a second negative electrode connector, formed on a terminal of the second negative connector; and
a plurality of second current paths, respectively formed between the second negative electrode connector and each of the negative electrodes of the second batteries;
wherein each of the second batteries has a total path length which is a sum of a length of the first current path and a length of the second current path corresponding to the same second battery, and the total path lengths of all of the second batteries are equal.

14. The battery parallel device as claimed in claim 13, wherein:
the second batteries of the second battery units of the at least one second parallel apparatus are second cylindrical batteries, and the second cylindrical batteries are mounted along a second direction;
the positive electrodes of the second cylindrical batteries face to the same direction, and the second battery units are separated from each other;
the second positive connector comprises:
a connecting part; and
a plurality of comb parts, separated from each other, and mounted along the second direction; wherein terminals of the comb parts that face the second direction are connected with the connecting part, and the comb parts are respectively electrically connected to the positive electrodes of the second cylindrical batteries of one of the second battery units;
the second negative connector comprises:
a connecting part; and
a plurality of comb parts, separated from each other, and mounted along the second direction; wherein terminals of the comb parts of the second negative connector that face a direction opposite to the second direction are connected with the connecting part of the second negative connector, and the comb parts of the second negative connector are respectively electrically connected to the negative electrodes of the second cylindrical batteries of one of the second battery units;
the second positive electrode connector is formed on the connecting part of the second positive connector; and
the second negative electrode connector is formed on the connecting part of the second negative connector.

15. The battery parallel device as claimed in claim 14, wherein the connecting part of the second positive connector of the at least one second parallel apparatus and the connecting part of the first negative connector of the at least one first parallel apparatus are integrally formed.

16. The battery parallel device as claimed in claim 14, wherein:
the second cylindrical batteries of one of the second battery units of the at least one second parallel apparatus are mounted to form two rows, and the second cylindrical batteries of the two different rows are staggered with each other;
each of the comb parts of the second positive connector is a rectangular sheet, and each of the comb parts of the second positive connector comprises a plurality of welding parts;
the welding parts of one of the comb parts of the second positive connector are mounted on two opposite sides of said one of the comb parts of the second positive connector, and the welding parts of the second positive connector are respectively welded at the positive electrodes of the second cylindrical batteries of one of the second battery units;
each of the comb parts of the second positive connector respectively comprises an elongate hole;
the elongate holes are respectively formed on the middle of the comb parts of the second positive connector, and are respectively formed along the second direction to separate the comb parts of the second positive connector to two opposite sides on which the welding parts are mounted opposite each other;
each of the comb parts of the second negative connector is a rectangular sheet, and each of the comb parts of the second negative connector comprises a plurality of welding parts;
the welding parts of one of the comb parts of the second negative connector are mounted on two opposite sides of said one of the comb parts of the second negative connector, and the welding parts of the second negative connector are respectively welded at the negative electrodes of the second cylindrical batteries of one of the second battery units;
each of the comb parts of the second negative connector respectively comprises an elongate hole;
the elongate holes are respectively formed on the middle of the comb parts of the second negative connector, and are respectively mounted along the second direction to separate the comb parts of the second negative connector to two opposite sides on which the welding parts are mounted opposite each other.

17. The battery parallel device as claimed in claim 16, wherein:
terminals of the comb parts of the second positive connector that face a direction opposite to the second direction each respectively comprise a gap, and the gaps of the comb parts of the second positive connector are respectively connected to the elongate holes of the comb parts of the second positive connector;
the terminals of the comb parts of the second negative connector that face the second direction each respectively comprise a gap, and the gaps of the comb parts of the second negative connector are respectively connected to the elongate holes of the comb parts of the second negative connector.

18. The battery parallel device as claimed in claim 14, wherein:
the comb parts of the second positive connector are perpendicular to the connecting part of the second positive connector; and
the comb parts of the second negative connector are perpendicular to the connecting part of the second negative connector.

19. The battery parallel device as claimed in claim 14, further comprising:
a shell, comprising:
a containing space;
a first half shell;
a second half shell, connecting with the first half shell to form the shell;
a plurality of first battery electrode openings, formed on a wall of the first half shell; and a plurality of second battery electrode openings, formed on a wall that is opposite to the wall having the first battery electrode openings;
wherein the first cylindrical batteries of the first battery units of the at least one first parallel apparatus and the second cylindrical batteries of the second battery units of the at least one second parallel apparatus are mounted in the containing space of the shell;
wherein the positive electrodes of the first cylindrical batteries are respectively mounted in the first battery electrode openings of the shell;
wherein the negative electrodes of the second cylindrical batteries are respectively mounted in the second battery electrode openings of the shell;
wherein the second positive connector of the at least one second parallel apparatus is mounted out of the first half shell and electrically connected to the positive electrodes of the second cylindrical batteries through the first battery electrode openings;
wherein the first negative connector of the at least one first parallel apparatus is mounted out of the first half shell and electrically connected to the negative electrodes of the first cylindrical batteries through the first battery electrode openings;
wherein the second positive connector of the at least one second parallel apparatus is mounted out of the first half shell and electrically connected to the positive electrodes of the second cylindrical batteries through the first battery electrode openings; and
wherein the second negative connector of the at least one second parallel apparatus is mounted out of the second half shell and electrically connected to the negative electrodes of the second cylindrical batteries through the second battery electrode openings.

20. The battery parallel device as claimed in claim 3, further comprising:
at least one second parallel apparatus, comprising:
a plurality of second battery units; wherein each of the second battery units comprises a plurality of second batteries, and each of the second batteries comprises a positive electrode and a negative electrode;
a second positive connector, electrically connected to the positive electrodes of the second batteries of the second battery units;
a second negative connector, electrically connected to the negative electrodes of the second batteries of the second battery units;
a second positive electrode connector, formed on a terminal of the second positive connector;
a plurality of first current paths, respectively formed between the second positive electrode connector and each of the positive electrodes of the second batteries;
a second negative electrode connector, formed on a terminal of the second negative connector; and
a plurality of second current paths, respectively formed between the second negative electrode connector and each of the negative electrodes of the second batteries;
wherein each of the second batteries has a total path length which is a sum of a length of the first current path and a length of the second current path corresponding to the same second battery, and the total path lengths of all of the second batteries are equal.

21. The battery parallel device as claimed in claim 20, wherein:

the second batteries of the second battery units of the at least one second parallel apparatus are second cylindrical batteries, and the second cylindrical batteries are mounted along a second direction;
the positive electrode of the second cylindrical batteries face to the same direction, and the second battery units are separated from each other;
the second positive connector comprises:
a connecting part; and
a plurality of comb parts, separated from each other, and mounted along the second direction; wherein terminals of the comb parts that face the second direction are connected with the connecting part, and the comb parts are respectively electrically connected to the positive electrodes of the second cylindrical batteries of one of the second battery units;
the second negative connector comprises:
a connecting part; and
a plurality of comb parts, separated from each other, and mounted along the second direction; wherein terminals of the comb parts of the second negative connector that face a direction opposite to the second direction are connected with the connecting part of the second negative connector, and the comb parts of the second negative connector are respectively electrically connected to the negative electrodes of the second cylindrical batteries of one of the second battery units;
the second positive electrode connector is formed on the connecting part of the second positive connector; and
the second negative electrode connector is formed on the connecting part of the second negative connector.

22. The battery parallel device as claimed in claim 21, wherein the connecting part of the second positive connector of the at least one second parallel apparatus and the connecting part of the first negative connector of the at least one first parallel apparatus are integrally formed.

23. The battery parallel device as claimed in claim 21, wherein:
the second cylindrical batteries of one of the second battery units of the at least one second parallel apparatus are mounted to form two rows, and the second cylindrical batteries of the two different rows are staggered with each other;
each of the comb parts of the second positive connector is a rectangular sheet, and each of the comb parts of the second positive connector comprises a plurality of welding parts;
the welding parts of one of the comb parts of the second positive connector are mounted on two opposite sides of said one of the comb parts of the second positive connector, and the welding parts of the second positive connector are respectively welded at the positive electrodes of the second cylindrical batteries of one of the second battery units;
each of the comb parts of the second positive connector respectively comprises an elongate hole;
the elongate holes are respectively formed on the middle of the comb parts of the second positive connector, and are respectively formed along the second direction to separate the comb parts of the second positive connector to two opposite sides on which the welding parts are mounted opposite each other;
each of the comb parts of the second negative connector is a rectangular sheet, and each of the comb parts of the second negative connector comprises a plurality of welding parts;

the welding parts of one of the comb parts of the second negative connector are mounted on two opposite sides of said one of the comb parts of the second negative connector, and the welding parts of the second negative connector are respectively welded at the negative electrodes of the second cylindrical batteries of one of the second battery units;

each of the comb parts of the second negative connector respectively comprises an elongate hole;

the elongate holes are respectively formed on the middle of the comb parts of the second negative connector, and are respectively mounted along the second direction to separate the comb parts of the second negative connector to two opposite sides on which the welding parts are mounted opposite each other.

24. The battery parallel device as claimed in claim 23, wherein:

terminals of the comb parts of the second positive connector that face a direction opposite to the second direction each respectively comprise a gap, and the gaps of the comb parts of the second positive connector are respectively connected to the elongate holes of the comb parts of the second positive connector; and the terminals of the comb parts of the second negative connector that face the second direction each respectively comprise a gap, and the gaps of the comb parts of the second negative connector are respectively connected to the elongate holes of the comb parts of the second negative connector.

25. The battery parallel device as claimed in claim 21, wherein:

the comb parts of the second positive connector are perpendicular to the connecting part of the second positive connector; and the comb parts of the second negative connector are perpendicular to the connecting part of the second negative connector.

26. The battery parallel device as claimed in claim 21, further comprising:

a shell, comprising:
a containing space;
a first half shell; and
a second half shell, connecting with the first half shell to form the shell;
a plurality of first battery electrode openings, formed on a wall of the first half shell; and
a plurality of second battery electrode openings, formed on a wall that is opposite to the wall having the first battery electrode openings;

wherein the first cylindrical batteries of the first battery units of the at least one first parallel apparatus and the second cylindrical batteries of the second battery units of the at least one second parallel apparatus are mounted in the containing space of the shell;

wherein the positive electrodes of the first cylindrical batteries are respectively mounted in the first battery electrode openings of the shell;

wherein the negative electrodes of the second cylindrical batteries are respectively mounted in the second battery electrode openings of the shell;

wherein the second positive connector of the at least one second parallel apparatus is mounted out of the first half shell and electrically connected to the positive electrodes of the second cylindrical batteries through the first battery electrode openings;

wherein the first negative connector of the at least one first parallel apparatus is mounted out of the first half shell and electrically connected to the negative electrodes of the first cylindrical batteries through the first battery electrode openings;

wherein the second positive connector of the at least one second parallel apparatus is mounted out of the first half shell and electrically connected to the positive electrodes of the second cylindrical batteries through the first battery electrode openings; and wherein the second negative connector of the at least one second parallel apparatus is mounted out of the second half shell and electrically connected to the negative electrodes of the second cylindrical batteries through the second battery electrode openings.

27. The battery parallel device as claimed in claim 4, further comprising:

at least one second parallel apparatus, comprising:
a plurality of second battery units; wherein each of the second battery units comprises a plurality of second batteries, and each of the second batteries comprises a positive electrode and a negative electrode;
a second positive connector, electrically connected to the positive electrodes of the second batteries of the second battery units;
a second negative connector, electrically connected to the negative electrodes of the second batteries of the second battery units;
a second positive electrode connector, formed on a terminal of the second positive connector;
a plurality of first current paths, respectively formed between the second positive electrode connector and each of the positive electrodes of the second batteries;
a second negative electrode connector, formed on a terminal of the second negative connector; and
a plurality of second current paths, respectively formed between the second negative electrode connector and each of the negative electrodes of the second batteries;

wherein each of the second batteries has a total path length which is a sum of a length of the first current path and a length of the second current path corresponding to the same second battery, and the total path lengths of all of the second batteries are equal.

28. The battery parallel device as claimed in claim 27, wherein:

the second batteries of the second battery units of the at least one second parallel apparatus are second cylindrical batteries, and the second cylindrical batteries are mounted along a second direction;

the positive electrodes of the second cylindrical batteries face to the same direction, and the second battery units are separated from each other;

the second positive connector comprises:
a connecting part; and
a plurality of comb parts, separated from each other, and mounted along the second direction; wherein terminals of the comb parts that face the second direction are connected with the connecting part, and the comb parts are respectively electrically connected to the positive electrodes of the second cylindrical batteries of one of the second battery units;

the second negative connector comprises:
a connecting part; and
a plurality of comb parts, separated from each other, and mounted along the second direction; wherein terminals of the comb parts of the second negative connector that face a direction opposite to the second direction are connected with the connecting part of the second negative connector, and the comb parts of the second negative connector are respectively electrically connected to the negative electrodes of the second cylindrical batteries of one of the second battery units;

the second positive electrode connector is formed on the connecting part of the second positive connector; and the second negative electrode connector is formed on the connecting part of the second negative connector.

29. The battery parallel device as claimed in claim 28, wherein the connecting part of the second positive connector of the at least one second parallel apparatus and the connecting part of the first negative connector of the at least one first parallel apparatus are integrally formed.

30. The battery parallel device as claimed in claim 28, wherein:

the second cylindrical batteries of one of the second battery units of the at least one second parallel apparatus are mounted to form two rows, and the second cylindrical batteries of the two different rows are staggered with each other;

each of the comb parts of the second positive connector is a rectangular sheet, and each of the comb parts of the second positive connector comprises a plurality of welding parts;

the welding parts of one of the comb parts of the second positive connector are mounted on two opposite sides of said one of the comb parts of the second positive connector, and the welding parts of the second positive connector are respectively welded at the positive electrodes of the second cylindrical batteries of one of the second battery units;

each of the comb parts of the second positive connector respectively comprises an elongate hole;

the elongate holes are respectively formed on the middle of the comb parts of the second positive connector, and are respectively formed along the second direction to separate the comb parts of the second positive connector to two opposite sides on which the welding parts are mounted opposite each other;

each of the comb parts of the second negative connector is a rectangular sheet, and each of the comb parts of the second negative connector comprises a plurality of welding parts;

the welding parts of one of the comb parts of the second negative connector are mounted on two opposite sides of said one of the comb parts of the second negative connector, and the welding parts of the second negative connector are respectively welded at the negative electrodes of the second cylindrical batteries of one of the second battery units;

each of the comb parts of the second negative connector respectively comprises an elongate hole; and the elongate holes are respectively formed on the middle of the comb parts of the second negative connector, and are respectively mounted along the second direction to separate the comb parts of the second negative connector to two opposite sides on which the welding parts are mounted opposite each other.

31. The battery parallel device as claimed in claim 30, wherein:

terminals of the comb parts of the second positive connector that face a direction opposite to the second direction each respectively comprise a gap, and the gaps of the comb parts of the second positive connector are respectively connected to the elongate holes of the comb parts of the second positive connector; and the terminals of the comb parts of the second negative connector that face the second direction each respectively comprise a gap, and the gaps of the comb parts of the second negative connector are respectively connected to the elongate holes of the comb parts of the second negative connector.

32. The battery parallel device as claimed in claim 28, wherein:

the comb parts of the second positive connector are perpendicular to the connecting part of the second positive connector; and the comb parts of the second negative connector are perpendicular to the connecting part of the second negative connector.

33. The battery parallel device as claimed in claim 28, further comprising:

a shell, comprising:
a containing space;
a first half shell;
a second half shell, connecting with the first half shell to form the shell;
a plurality of first battery electrode openings, formed on a wall of the first half shell; and
a plurality of second battery electrode openings, formed on a wall that is opposite to the wall having the first battery electrode openings;

wherein the first cylindrical batteries of the first battery units of the at least one first parallel apparatus and the second cylindrical batteries of the second battery units of the at least one second parallel apparatus are mounted in the containing space of the shell;

wherein the positive electrodes of the first cylindrical batteries are respectively mounted in the first battery electrode openings of the shell;

wherein the negative electrodes of the second cylindrical batteries are respectively mounted in the second battery electrode openings of the shell;

wherein the second positive connector of the at least one second parallel apparatus is mounted out of the first half shell and electrically connected to the positive electrodes of the second cylindrical batteries through the first battery electrode openings;

wherein the first negative connector of the at least one first parallel apparatus is mounted out of the first half shell and electrically connected to the negative electrodes of the first cylindrical batteries through the first battery electrode openings;

wherein the second positive connector of the at least one second parallel apparatus is mounted out of the first half shell and electrically connected to the positive electrodes of the second cylindrical batteries through the first battery electrode openings; and wherein the second negative connector of the at least one second parallel apparatus is mounted out of the second half shell and electrically connected to the negative electrodes of the second cylindrical batteries through the second battery electrode openings.

\* \* \* \* \*